United States Patent
Phillips

(10) Patent No.: US 9,940,801 B2
(45) Date of Patent: Apr. 10, 2018

(54) MULTI-FUNCTION PER-ROOM AUTOMATION SYSTEM

(71) Applicant: Microsoft Technology Licensing, LLC, Redmond, WA (US)

(72) Inventor: Joseph Benjamin Phillips, Reading (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/136,703

(22) Filed: Apr. 22, 2016

(65) Prior Publication Data

US 2017/0309142 A1  Oct. 26, 2017

(51) Int. Cl.
| G08B 13/00 | (2006.01) |
| G08B 13/16 | (2006.01) |
| G08B 7/06 | (2006.01) |
| H04L 29/08 | (2006.01) |
| G05B 15/02 | (2006.01) |

(52) U.S. Cl.
CPC ......... *G08B 13/1672* (2013.01); *G05B 15/02* (2013.01); *G08B 7/066* (2013.01); *H04L 67/12* (2013.01); *G05B 2219/2642* (2013.01)

(58) Field of Classification Search
None
See application file for complete search history.

(56) References Cited

U.S. PATENT DOCUMENTS

| 8,917,186 | B1 | 12/2014 | Grant | |
| 9,115,908 | B2 | 8/2015 | Shetty et al. | |
| 2011/0193714 | A1* | 8/2011 | Albert | G08B 1/08 340/635 |
| 2012/0085831 | A1 | 4/2012 | Kopp et al. | |

(Continued)

FOREIGN PATENT DOCUMENTS

WO  2014047501 A1  3/2014

OTHER PUBLICATIONS

Blissett-Griffiths, Charlotte, "Solutions: KNX Multiroom and Multiuser Music Systems", Published on: Sep. 7, 2015, 4 pages. Available at: http://knxtoday.com/2015/09/6511/solutions-knx-multiroom-and-multiuser-music-systems.html.

(Continued)

*Primary Examiner* — George Bugg
*Assistant Examiner* — Renee Dorsey

(57) ABSTRACT

Examples are directed towards providing a set of hub devices for providing per-room monitoring of an area associated with a structure. A set of hub devices monitors movements of a user through the monitored area to generate user traffic data. A dynamic map of the monitored area is generated based on the user traffic data. The set of hub devices detects sounds occurring within the monitored area. The detected sounds are identified. Some of the detected sounds are amplified and replayed on speaker(s) within the monitored area. Notifications of some detected sounds are provided to user device(s) to notify at least one user of the occurrence of the detected sounds. If a detected sound (Continued)

indicates a safety issue, a safe route leading from a current location of the user to a different potentially safer location is generated and provided to the user to facilitate an evacuation.

7 Claims, 15 Drawing Sheets

(56) References Cited

U.S. PATENT DOCUMENTS

| | | | | |
|---|---|---|---|---|
| 2012/0275610 | A1* | 11/2012 | Lambert | G10L 25/48 381/56 |
| 2013/0129103 | A1 | 5/2013 | Donaldson | |
| 2013/0322648 | A1 | 12/2013 | Chukka et al. | |
| 2014/0266669 | A1 | 9/2014 | Fadell et al. | |
| 2014/0270235 | A1 | 9/2014 | Shin et al. | |
| 2014/0313034 | A1* | 10/2014 | Dodson | G08B 25/006 340/541 |
| 2014/0347181 | A1* | 11/2014 | Luna | H04M 1/72569 340/539.22 |
| 2015/0015401 | A1 | 1/2015 | Wedig et al. | |
| 2015/0161882 | A1 | 6/2015 | Lett | |
| 2015/0208166 | A1 | 7/2015 | Raghuvanshi et al. | |
| 2016/0035205 | A1* | 2/2016 | Messenger | A61B 5/746 340/539.15 |
| 2016/0036958 | A1* | 2/2016 | Logan | G05B 19/042 455/414.1 |
| 2016/0093198 | A1* | 3/2016 | Tung | G08B 25/016 340/539.11 |
| 2016/0110994 | A1* | 4/2016 | Taylor | G08B 29/22 340/514 |
| 2016/0286327 | A1* | 9/2016 | Marten | H04R 29/008 |
| 2016/0299256 | A1* | 10/2016 | Modi | G01W 1/10 |
| 2016/0300386 | A1* | 10/2016 | Bostick | G06T 11/60 |
| 2016/0381537 | A1* | 12/2016 | R | H04W 4/22 455/404.1 |

OTHER PUBLICATIONS

"PCWorld", Retrieved on: Oct. 28, 2015, 4 pages. Available at: http://www.pcworld.co.uk/gbuk/audio-buying-guide-multiroom-458-commercial.html.

"Loxone: Always in Tune With Your Lifestyle", Published on: Mar. 25, 2015, 8 pages. Available at: http://www.loxone.com/enen/smart-home/everything-managed/music.html.

"LG Music Flow", Published on: Sep. 11, 2015, 3 pages. Available at: http://www.lg.com/uk/musicflow/av/MusicFlow_overview.

"Samsung—Tomorrow", Published on: May 19, 2014, 7 pages. Available at: http://www.samsung.com/uk/discover/in_the_home/music-everywhere-the-wireless-multiroom-home-audio-revolution/.

"VibeHub™ Multiroom Audio Platform", Published on: Sep. 6, 2015, 3 pages. Available at: http://www.csr.com/products/vibehub-multiroom-audio-platform.

"Control 4: System User Guide", Published on: Mar. 27, 2014, 160 pages. Available at: http://www.control4.com/docs/product/control4-system/user-guide/latest/control4-system-user-guide-rev-t.pdf.

"Alarm.com: Interactive Security", Published on: Jun. 2, 2014, 8 pages. Available at: https://www.alarm.com/productservices/interactive_security.aspx.

"MarCell: Temperature, Humidity, Power and Water Alarm", Retrieved on: Oct. 28, 2015, 2 pages. Available at: http://www.protectedhome.com/documents/HS500SLMarcellTrifoldFlyer.pdf.

"International Search Report and Written Opinion Issued in PCT Application No. PCT/US2017/027839", dated Nov. 22, 2017, 23 Pages.

* cited by examiner

MONITORED AREA
200

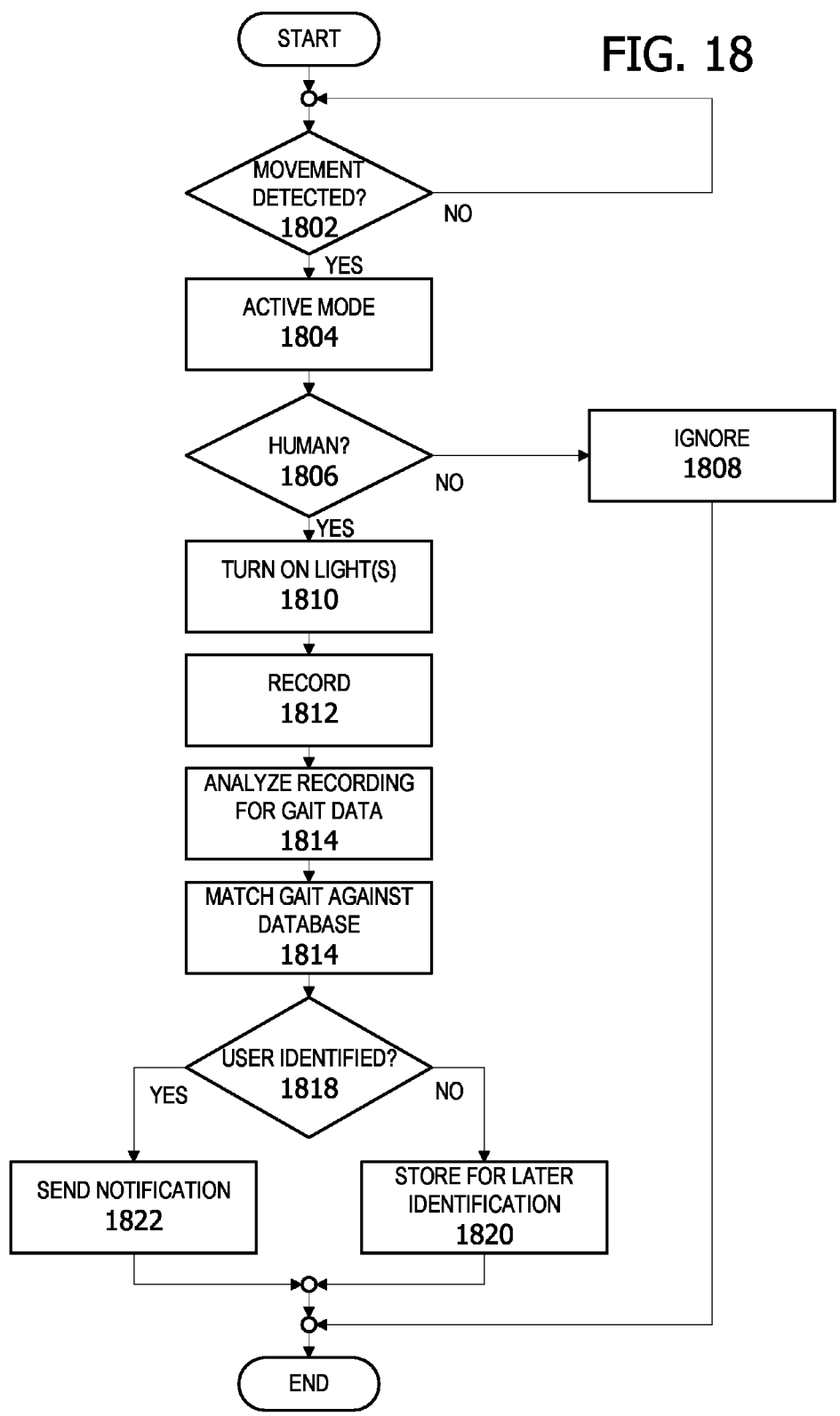

MULTI-FUNCTION PER-ROOM AUTOMATION SYSTEM

BACKGROUND

Installation of current home automation systems typically involve removal and replacement of pre-existing legacy devices with new controllable devices. These conversions may be expensive and time intensive to install and set up. Moreover, these systems have limitations. For example, many automation solutions address one particular task. To work together, these systems require programming and are frequently difficult to setup. Other automation systems operate in the cloud to make different devices work together. This may cause privacy concerns as well as failure of the system if the Internet connection goes down. In addition, other systems may rely on applications implemented on user devices to control different automated systems, which may limit use of the automated systems when a user device is unavailable or an application may not be easily located.

SUMMARY

Examples of the disclosure provide an automation system including a set of hub devices associated with a monitored area. The monitored area includes a set of rooms associated with a structure. A set of microphones are communicatively coupled to one or more of the hub devices in the set of hub devices via a network. A set of speakers are communicatively coupled to one or more of the hub devices in the set of hub devices via the network. A hub controller within the set of hub devices is associated with a room in the set of rooms. The hub controller monitors a portion of the monitored area. The hub controller includes a memory storing a sound analysis engine component. The sound analysis engine component is executed by a processor to passively detect a non-oral sound during a sleep mode of the hub controller by one or more microphones in the set of microphones. The sound analysis engine records the non-oral sound on determining the non-oral sound exceeds a sleep mode threshold sound level to generate a recorded sound. A notification of the recorded sound is sent to one or more user devices to notify a user of the occurrence of the non-oral sound.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 18 is an exemplary flow chart illustrating operation of a hub device identifying a user based on gait.

DETAILED DESCRIPTION

Figure 1:
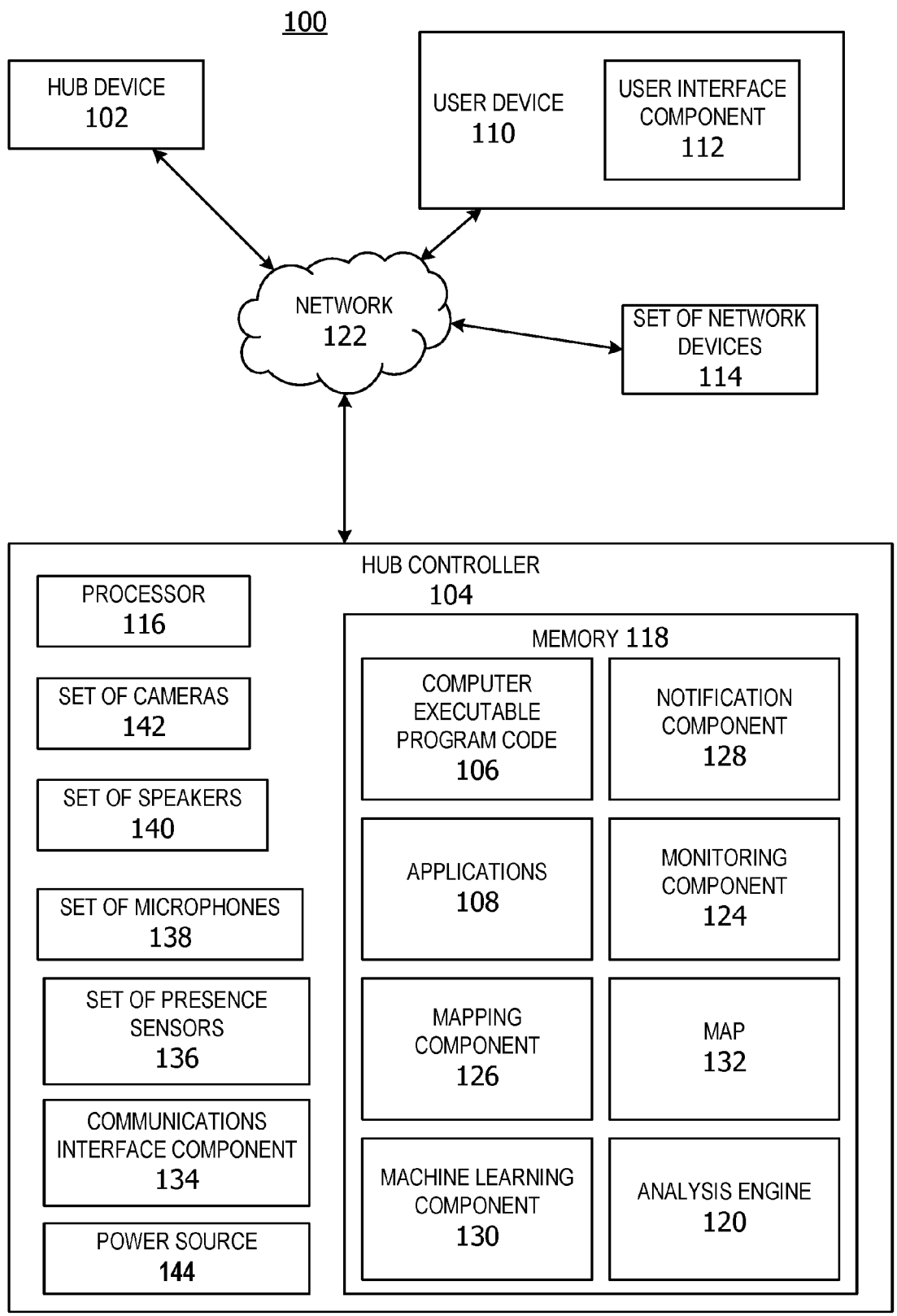
FIG. 1 is an exemplary block diagram illustrating a hub environment.

Referring to the figures, examples of the disclosure enable an automation system for managing one or more other devices. In some examples, the system includes a set of hub devices. As used herein, the term set refers to one or more. Thus, the set of hub devices includes one or more hub devices.

The set of hub devices in some examples includes a hub controller and at least one other hub device for monitoring and performing tasks associated with a monitored area. The monitoring may include per-room monitoring, per-floor monitoring, or per-area monitoring and device automation.

Other voice enabled automation systems require a specific activation command before they will actively obtain data or output data. Without this activation command, current systems are asleep or otherwise inactive. In contrast, the set of hub devices provided by some of the examples detects and identifies sounds originating from within the monitored area during a sleep mode or a semi-sleep mode, as well as the active mode. If a sound detected during the sleep mode exceeds a sleep mode sound level threshold, at least one hub device in the set of hub devices switches to from the sleep mode to an active mode. In other examples, if a detected sound is above the threshold but it is an expected sound, the sound is ignored and the hub device automatically returns to the sleep mode without explicit user activation. This provides for improved responsiveness to non-oral sounds and improved security without a specific user activation command before analyzing available audio data to determine if user notification or other action is appropriate under the current circumstances.

In another example, if a detected sound is an unidentified sound or an identified but unexpected sound, the hub controller notifies at least one user of the sound. This sound notification enables improved security within the monitored area, as well as improved responsiveness of users to alarms and other potential situations for which a user may wish to be notified.

Other examples further provide for recording a sound detected in one portion of a monitored area, amplifying the sound, and playing the amplified sound on one or more speakers in a different portion of the monitored area occupied by the user. This feature enables the user to hear a sound or receive notification of a sound that would otherwise have been unheard or unnoticed by the user due to the different locality of the user relative to the point of origin of the sound. This notification or replay of the sound improves the user's information of safety or security conditions, as well as improves the user's ability to respond to changing conditions within the monitored area.

In still other examples, the system enables detection of specific sounds within a monitored area. A set of hub devices detect and identify alarms of preexisting, legacy security or safety equipment, such as smoke detectors, carbon monoxide detectors, burglar alarms, car alarms, or door bells. The set of hub devices may warn a user of the alarm by amplifying the alarm through one or more speakers or sending a notification to associated mobile user devices. This enables the user to continue using existing, legacy safety and security equipment without purchasing new, smart equipment. This may be more cost-efficient and less burdensome for some users to upgrade their homes, businesses, or other environments by enhancing or integrating existing devices with a hub device.

In some examples, the set of hub devices identifies a type of sound detected within the monitored area by comparing the sound to a local database of pre-identified sounds. This feature enables decreased network bandwidth usage and increased data transmission security.

Likewise, in other examples, the system deploys the same software on each hub device in the set of hub devices. The hub devices communicate and share data with each other via a local area network (LAN). In this manner, the hub devices may connect directly even when the Internet is unavailable during normal operations. This feature also enables reduces network bandwidth usage and improved security for data transmissions.

In other examples, the set of hub devices monitors movements of one or more users moving through one or more portions of the monitored area to generate user traffic data. A mapping component generates a map of the monitored area. If a safety issue indicates one or more users should leave their current location and move to another, different location, the set of hub devices determines another location for relocation of the one or more users. The set of hub devices generates a safe route from the current location of the one or more users to the other location and transmits the safe route to the user. The safe route may be a safe path leading from a first location within the monitored area to a second, different location within the monitored area, a safe path leading from a location outside the monitored area to a location within the monitored area, or a path leading from a location inside the monitored area to a location outside the monitored area.

The other location is a location that is determined to be potentially safer based on a type of safety issued detected and a distance of the other location from the user's current location. The safe route, in this non-limiting example, includes a path from the user's current location to the different location.

The safe route may be provided in a graphical form via a visual map displayed to the user by a display device. In some examples, the safe route may be provided to the user in an audio format, via one or more speakers of a hub device or set of hub devices, to audibly guide a user away from a detected safety issue. In still other examples, the set of hub devices activates and de-activates a set of lights within the monitored area to illuminate the safe route for the user. This mapping feature provides improved safety and security for user's during an evacuation or other relocation situation. The safe route decreases user confusion during an evacuation, improves safety for the user, increases the speed of evacuations, and decreases delays in reaching a nearest safe location by providing an efficient, customized route for each individual user based on the user's current location, characteristics of the user, state of each hub device in the set of hub devices, and a current, real-time map of the monitored area.

A user profile provides characteristics of the user, user preferences, default settings for the user, and other information that may be used for generating the safe route for that particular user. The user profile in this example is a user configured profile generate in whole or in part by one or more users.

The state of one or more hub devices may also be used to generate the safe route. Each hub device in some examples is in communication with other hub devices in the set of hub devices. If communication with one hub device is lost or state data indicates a hub device is no longer operational, this information may be used to determine safe areas or safe routes. For example, is a fire alarm is triggered, temperature sensors indicate a higher temperature on a second floor of a structure, and communication with hub devices on the second floor is lost, this information may be used by the machine learning to determine that the second floor is no longer accessible due to possible fire or fire damage.

A status of a hub device may be requested by another hub device. For example, a first hub device may send a request for a status update from a second hub device. If no response is received after a threshold time period, such as a five second threshold time, the second hub device is determined to be inoperable.

In another example, a status of a hub device is inferred based on a failure to receive sensor data or other information from a particular hub device for a threshold period of time. In this example, a hub device is determined to be inoperable without expressly requesting a status update from the hub device.

In some examples, the machine learning utilizes the user profile, the user's current location, the map, state of hub devices, and other information associated with current environmental conditions to generate a customized safe route for a specific user. For example, a user profile may indicate that a user is wheelchair-bound. In such a case, a hub device creates a safe route that includes ramps and avoids stairs. The hub device may also recognize that in a situation where power may be compromised, an electric chair lift may be unavailable.

In another example, the hub device utilizes a user profile to determine whether a user is visually impaired. In such cases, the hub device generates a route that is output in an auditory format so the user may listen to the route directions.

In yet another example, the user profile may indicate a user is deaf or hearing impaired. In this example, the hub device generates a safe route that is output in a visual format, such as using graphics or other visual cues to guide the user out. Visual cues include, without limitation, lights, arrows, text, or other visual elements.

In other examples, the system includes a plurality of sensors for monitoring an environment in a room or other portion of a monitored area. Multiple hub devices communicate with each other, adjusting one or more systems or devices based on sensor data indicating whether a user is present within the room, light levels, temperature, and other sensor data. This enables greater ease of use of the system by users and improved user efficiency and interaction with a user interface of the disclosed system.

In other examples, the hub device communicates with one or more other hub devices via a network to adjust one or more systems of an environment depending on what the occupants of the environment may be doing and where they are currently located within the monitored area. This feature also enables improved user efficiency and interaction with a user interface of the disclosed system.

Referring again to FIG. 1, an exemplary block diagram illustrates a hub environment. In the example of FIG. 1, the hub system 100 may include hub device 102 and hub controller 104, which may be a set of one or more hub devices associated with a monitored area (not shown) for monitoring and multifunction automated operations. The hub system 100 may also provide automatic management or integration of a plurality of devices associated with the monitored area. A hub device in the set of hub devices, such as hub device 102 and hub controller 104, represents any device executing computer executable program code 106 (e.g., as application(s) 108, operating system functionality, or both) to implement the operations and functionality associated with the hub device. The computer executable program code 106 may also be referred to as instructions or computer executable instructions.

A hub device in some non-limiting examples is implemented in a container that may be placed on any type of surface, such as a table, shelf, or mantelpiece for example, with visibility of the monitored area or a portion of the monitored area, such as a room. The hub device may have visibility of one or more entry or exit points to and from the monitored area or portion of the monitored area. The hub device includes access to a power source, such as a power outlet or battery. The casing in some examples may be replaceable to allow for aesthetic customization of the hub device, such as to fit within the decoration or visual appearance of the monitored area. In other examples, the hub device is a combined set top box and hub device.

The set of hub devices are configured to automatically control, interact, integrate, or enhance one or more other devices associated with or implemented within the monitored area. The other devices may include devices having network capabilities, wireless capabilities, or connected to a wireless capable switch or other device, enabling a hub device to control, manage, or otherwise communicate with another device, such as to turn the other device on or off, change a setting on the other device, adjust a volume, or otherwise interact with the device wirelessly.

Non-limiting examples of controllable devices in a monitored area may include speakers, microphones, lights, thermostat, power socket switches, smart switches, sensors, automatic locking mechanisms, audio equipment, television (TV), video equipment, photographic equipment, alarms, air conditioning units, central heat, hot water heater, radiator valve controller, automatic watering systems, audio streamer, appliances, security control panel, door bell, cellular phone, or landline phone, or any other suitable network capable device.

Other devices are automatically controlled or adjusted by one or more hub devices via infrared (IR), Wi-Fi, AllJoyn, BLUETOOTH, as well as any other automation protocols. AllJoyn is a system that permits compatible devices and applications to communicate with each other. Compatible devices as used here includes devices that are compatible with the network or network protocols, such as, but not limited to, AllJoyn.

A hub device may also optionally be physically connected to the other device to control the device. For example, a hub device may be integrated into or connected physically to a light switch, a television, a speaker, or other device. In still other examples, the other devices may also be controlled by a user manipulating one or more physical switches or buttons located on the other device.

A hub device in some examples controls another device to turn it off, turn it on, dim a light, change programmable content, sound an alarm, stop an alarm, answer a call, terminate a call, activate an intercom, or any other function of the controllable device. The functions of the other devices in some examples are configured in the following way: for {device}, {verb (for example on|off|play|stop)} when {room|home} detects {presence|light|sound} at level {level}.

In other examples, the set of hub devices optionally receives data from a set of sensors, such as a camera, microphone, IR sensor, light sensor, thermometer, passive infrared (PIR) sensor, or any other type of sensors. The set of hub devices utilizes the sensor data received from the set of sensors to identify users, create a map of a monitored area, adjust one or more settings on the other devices, or other actions performed automatically by the set of hub devices. In some examples, one or more of the sensors from the set of sensors may be implemented as part of a hub device.

The system 100 optionally includes one or more user devices. The user device, such as user device 110, may include a hub application for sending data to one or more hub devices or receiving data from one or more hub devices in the set of hub devices. A user device may include, without limitation, a mobile computing device or any other portable device. In some examples, the mobile computing device includes a mobile telephone, laptop, tablet, computing pad, netbook, gaming device, global positioning system (GPS) enabled device, wearable device, or portable media player.

The user device may also include less portable devices such as desktop personal computers, kiosks, tabletop devices, industrial control devices, wireless charging stations, electric automobile charging stations, or computing devices incorporated into a vehicle. Additionally, the user device 110 may represent a group of processing units or other computing devices.

The user device 110 may have at least one processor, a memory area, and at least one user interface component 112. The processor executes a hub application for receiving information from a hub device, such as notifications, dynamic maps, or dynamic safe routes.

In some examples, the user interface component 112 includes a graphics card for displaying data to the user and receiving data from the user. The user interface component may also include computer-executable instructions (e.g., a driver) for operating the graphics card. Further, the user interface component 112 may include a display (e.g., a touch screen display or natural user interface) or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

In other examples, the hub application running on the user device 110 controls one or more devices, such as a smart switch associated with a light. The hub application in some examples may control a light for whichever room the user is occupying, by detecting a user presence in the room via a hub device located in or near the room, turning the light on when the user presence is detected and off when the user presence is no longer detected. From the hub application, the user may select the audio to play or any other controllable element of the room the user occupies. The hub application in other examples controls devices or other controllable elements in one or more other rooms within the monitored area as well.

The hub controller 104 is a hub device in the set of hub devices for managing one or more other hub devices in the set of hub devices. The hub controller 104 performs the role of a master hub device to one or more other slave hub devices. The hub controller 104 requests presence data, sound data, and other status information from one or more other hub devices in the set of hub devices. The hub controller 104 utilizes this data gathered from the one or more other slave hub devices to identify a current location of a user, generate a map of the monitored area, determine whether to generate a safe route, generate the safe route through a portion of the monitored area, output the safe route to the user, identify an origin of a detected sound, perform an appropriate action in response to detecting a sound within the monitored area, output an identification of a sound to a user, wake one or more hub devices from a sleep mode to an active mode, or identify a user based on user's gate, in some examples.

An active mode, as used herein, may be a higher power mode, while a passive mode may be a low power or sleep mode. In this example, switching from the passive mode to the active mode includes activating the hub device into a higher power state. For example, the active mode may be a mode in which the hub device actively collects or requests data from one or more sensor devices while the passive mode may be a mode in which the hub device only passively receives data sent by the one or more sensors to the hub device.

The hub controller 104 optionally utilizes data from one or more hub devices to control one or more other devices in a set of network devices 114 within the monitored area. The set of network devices 114 includes one or more network devices. A network device is any type of device that is controllable by a hub device or a hub application on a user device. A network device includes a light, a doorbell, a thermostat, an intercom, a camera, a microphone, a speaker, a television, a display device, a radio, an audio streamer, an alarm, or any other networked device.

The hub controller 104 may be enabled to automatically turn on or off, or otherwise control or manage, one or more of the network devices in the set of devices 114. For example, the hub controller 104 may turn on a light, turn off a light, receive signals from a doorbell, activate an intercom, turn on a television, turn off a television, change video content playing on a television or other output device, change audio content playing on a speaker based on user location and identify of a user, turn on an alarm, amplify a sound through a speaker, or automatically perform other functions associated with one or more other devices within the monitored area.

In some examples, the set of network devices 114 includes one or more wireless lights. In other examples, the set of network devices 114 includes one or more lights controlled by one or more networked switches connected to the light.

In another example, a wireless doorbell may communicate with the hub device via a function call over AllJoyn. The hub device optionally plays a customized door chime if the monitored area is occupied or notifies users outside of the monitored area via a mobile hub application running on a user device.

The hub controller 104 includes at least one processor 116 and a memory 118. The memory 118 optionally stores an analysis engine 120. Processor 116 executes the analysis engine to monitor at least a portion of the monitored area. Processor 116 may include any number of processing units, and may be programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 12, FIG. 13, FIG. 14, FIG. 15, FIG. 16, FIG. 17, or FIG. 18).

In some examples, the processor 116 represents an implementation of analog techniques to perform the operations described herein. For example, the operations may be performed by an analog computing device or a digital computing device.

The hub controller 104 device further has one or more computer readable media such as the memory 118. The memory 118 includes any quantity of media associated with or accessible by the hub controller 104 device. The memory 118 may be internal to the hub controller (as shown in FIG. 1), external to the hub controller (not shown), or both (not shown). The memory may include read-only memory or memory wired into an analog computing device.

The memory 118 optionally stores, among other data, one or more applications 108. The applications 108, when executed by the processor 116, operate to perform functionality on the computing device. Exemplary applications include mail application programs, web browsers, calendar application programs, messaging programs, location-based services, search programs, and the like. The applications may communicate with counterpart applications or services such as web services accessible via a network, such as network 122. For example, the applications may represent downloaded client-side applications that correspond to server-side services executing in a cloud, such as cloud storage shown in FIG. 6.

The memory 118 further stores an analysis engine 120. The analysis engine 120 is executed by one or more processors associated with one or more hub devices to detect sounds within the monitored area. The analysis engine identifies the sound and determines an appropriate action to take with regard to the sound. If the sound is unidentified, the analysis engine notifies a user. The user is notified, in some examples, by sending a notification including the unidentified sound to one or more user devices associated with one or more users. In other examples, the user is notified by a hub device amplifying the sound and playing the amplified sound via one or more microphones within the monitored area.

The memory 118 further stores one or more computer-executable components. Exemplary components may include a monitoring component 124, a mapping component 126, a notification component 128, or a machine learning component 130.

The monitoring component 124 may be executed by processor 116 to cause the processor to monitor sound, movement, and other environmental changes to a monitored area, such as movements of at least one user moving through at least a portion of the monitored area, for example. The monitoring component 124 detects changes in the environment of the monitored area via data received or obtained from one or more sensors. The one or more sensors may be communicatively coupled to hub controller 104, for example. The monitoring component 124 may generate monitoring data, such as user traffic data based on the detected movements of one or more users moving through the monitored area, for example.

The mapping component 126 is executed to cause the processor to generate a map 132 of at least a portion of the monitored area based on the user traffic data generated by monitoring component 124. In some examples, the map 132 is a dynamic map. A dynamic map is a map generated in real time during operation of the hub device. The dynamic map is updated by one or more hub devices to reflect changing conditions within the monitored area, such as safe paths through the monitored area, locations of user(s), locations of hazardous conditions, locations of accessible exit points, and other potentially changing information.

The map provides information associated with a monitored area. The map may include information associated with the inside of a main structure, the outside of a main structure, as well as secondary detached structures, such as a garden shed or detached garage. In some examples, the map 132 may include other features, such as a driveway, fences, gates, patio, or other features within the monitored area. The map in some examples provides a representation of a set of one or more room(s), passageways, exit points, locations of users within the monitored area, detached structures, or other information associated with the monitored area.

The notification component 128 is executed by the one or more processors to generate a notification of a detected environmental change, such as a sound, changes in temperature, presence of smoke, lighting levels, or movement. The notification is sent to one or more user devices to notify one or more users of the occurrence of the environmental change. In an example of a detected sound, the notification may include a recording of the sound, a time the sound occurred, an identification of the sound if known, an origin of the sound if known, a status of one or more hub devices, or any other information associated with the detected sound that is available to the set of hub devices.

In some examples, the analysis engine component 120 is executed to cause the at least one processor to determine a current location of at least one user within the monitored area based on a routine of the user, user traffic data, the map, or user presence data provided by one or more presence sensors. The presence sensor in some examples is implemented as a PIR presence sensor for detecting a presence of one or more users. In other examples, the presence sensor includes one or more cameras for detecting a presence of a user.

The machine learning component 130 is executed to identify patterns, user habits, and other use data associated with the set of hub devices in order to customize the hub device to the user or monitored area as well as improve upon detection, identification, and other capabilities over time. In some examples, machine learning component 130 may identify frequently traveled paths through the monitored area based on detected movement data from one or more hub devices, which may be used to determine a pattern of movement of one or more users through the monitored area. The machine learning component 130 in these examples assists the mapping component 126 in generating the map 132. In other examples, the machine learning component 130 identifies a user based on user routine data, presence data, the map, user traffic data, or other data available to the machine learning component.

In some examples, the hub controller 104 includes a communications interface component 134. The communications interface component 134 includes a network interface card or computer-executable instructions (e.g., a driver) for operating the network interface card. Communication between the set of hub devices, the user device, or other devices may occur using any protocol or mechanism over any wired or wireless connection. In some examples, the communications interface 134 is operable with short range communication technologies such as by using near-field communication (NFC) tags.

In other examples, the hub controller 104 includes a set of presence sensors 136. The set of presence sensors 136 includes one or more sensors for detecting a presence of a user in proximity to the presence sensor. A presence sensor in some examples is a PIR sensor. A presence sensor may be integrated into the hub device, connected to the hub device, or communicatively coupled to the hub device. In other words, the presence sensor may be attached to the hub device or detached from the hub device and connected via a network, such as network 122.

The network 122 may be any type of network for permitting one device to communicate with another device. The network 122 may be implemented as a local area network (LAN) or a wide area network (WAN), such as the Internet. The LAN may include a wired LAN or a wireless LAN. A wireless LAN may be implemented using Ethernet, Wi-Fi or any other type of LAN. The LAN in some examples utilizes a BLUETOOTH communications protocol, NFC technology, or any other type of technology for implementing a LAN. As used herein, a LAN may include a personal area network (PAN), a campus area network (CAN), or any other type of localized network.

Once hub devices connect with each other via the network, the set of hub devices may regularly ping each other at a specified interval, such as every five (5) minutes for example, to ensure each hub device in a set of hub devices is still working and connected. If a hub device becomes disconnected or appears to be showing results that seem to be incorrect in context to the other hub devices, users may be notified via the hub application on the user device.

In other examples, the system includes a set of microphones 138. The set of microphones 138 is a set of one or more microphones. A microphone in the set of microphones may be integrated directly into or physically attached to a hub device, as shown in FIG. 1. In other examples, a microphone in the set of microphones is detached or separate from the hub device. In these examples, the microphone may be a stand-alone microphone, an array microphone, or a microphone integrated into another device accessible by the set of hub devices via the network 122, such as user device 110, or any other type of microphone.

The hub controller 104 in this non-limiting example includes a set of speakers 140. The set of speakers is a set of one or more speaker devices. A speaker in the set of speakers 140 may be included within a hub device or detached from the hub device. In other words, a speaker may be a stand-alone speaker device, a speaker integrated into another device connected to the set of hub devices via the network, or any other type of speaker.

In some examples, the hub controller 104 includes a set of cameras 142. The set of cameras is a set of one or more cameras. A camera may be integrated directly into the hub controller 104, physically connected to the hub controller 104, or communicatively coupled to the hub controller via the network, such that the hub controller communicates and controls a camera in the set of cameras via the network 122.

The set of cameras 142 may record audio or video, or perform image capture, or any combination of audio, video, and image capture. The recorded audio, video, or image capture forms camera data. The camera data may be stored in a local database or other local data storage in some non-limiting examples. In other examples, the camera data is stored in whole or in part on a cloud storage or other remote data storage device.

A hub device, such as hub controller 104, may include power source 144. Power source 144 may include a battery, a power converter, power adapter, or any other suitable source of power. A battery may enable the hub device to continue operating when electrical power is down or otherwise unavailable. The battery may also be used to power the hub device during peak electricity hours to provide lower cost operation. For example, with the presence of a battery, the hub device may charge during cheaper energy hours and run off the battery during peak hours to reduce usage costs.

A hub device, such as the hub controller, may include a set of physical controls (not shown), such as one or more physical buttons or switches. The user may interact with a physical control to perform operations, such as to switch media channels, mute volume, adjust volume, adjust temperature, switch the hub device to sleep mode, and perform other functions via the physical controls.

In some examples, during a configuration stage, the hub controller 104 performs a sound test. During the sound test, the hub controller listens to various sounds created by one or more sources within the monitored area. For example, the hub controller 104 may listen to a smoke alarm sound generated by a smoke alarm in the monitored area, or a door bell sound generated by a door bell installed within the monitored area. The hub controller may learn these sounds by the user activating them as the hub controller listens. In this manner, the hub controller may dynamically create a local database of pre-identified sounds. These pre-identified sounds are shared with all the hub devices in the set of hub devices for a monitored area.

In other examples, the hub controller 104 performs an audio check to listen to voice commands over other sounds. The hub controller 104 asks to pair with the devices for use in the room. In some examples, these devices include light switches, thermostats, music players, phones, televisions, radios, alarms, and other devices. In some examples, the hub devices communicate with one or more devices, such as a light switch, using a protocol such as BLUETOOTH, Z-Wave, or light wave radio frequency for existing smart remote controllable light switches. The hub device(s) learn the remote codes for any equipment that is only controllable via IR during this configuration stage.

Figure 2:
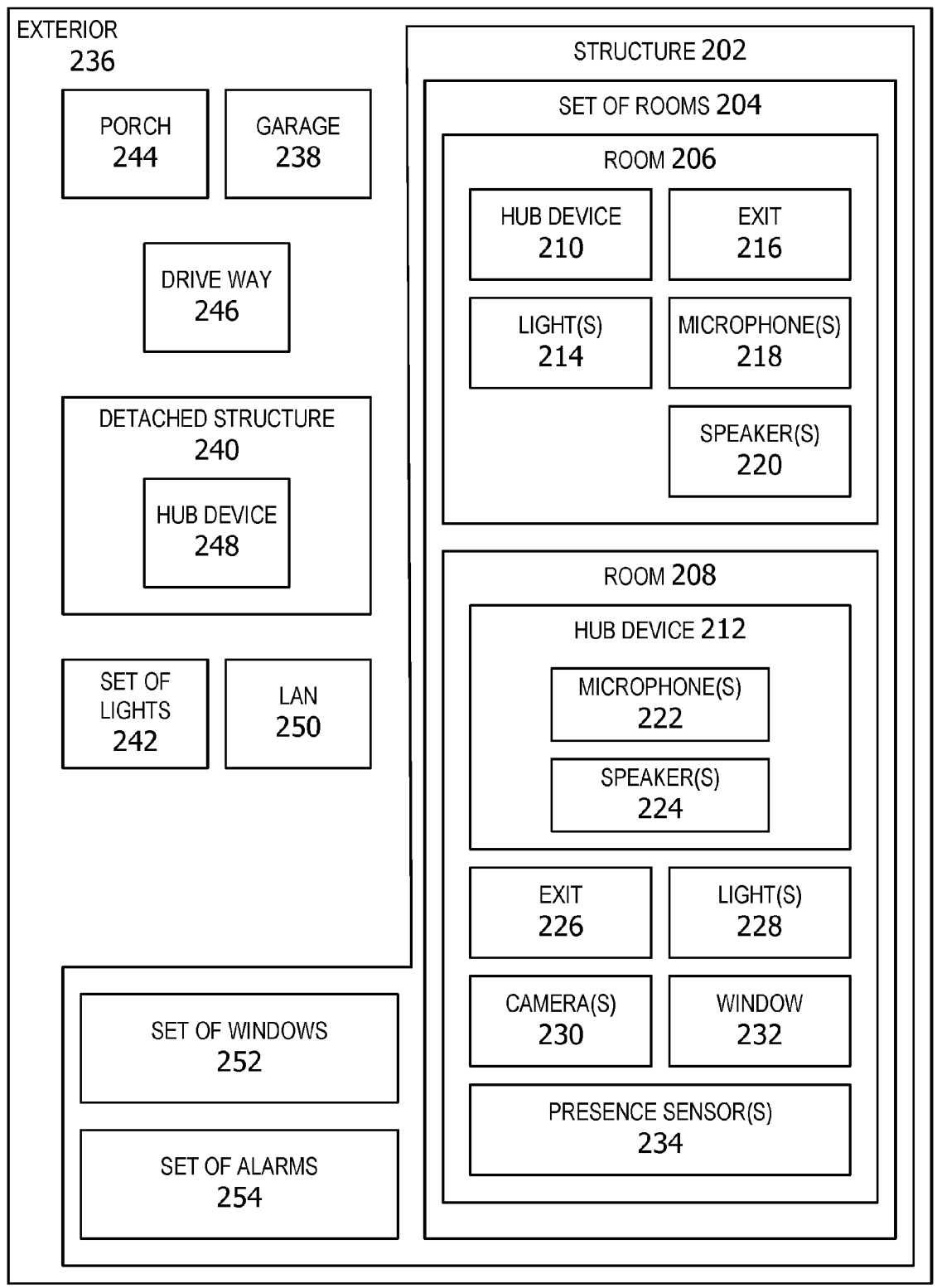
FIG. 2 is an exemplary block diagram illustrating a monitored area.

Referring now to FIG. 2, an exemplary block diagram illustrating a monitored area is shown. A monitored area 200 is an area monitored by one or more hub devices. The monitored area 200 includes one or more structures, such as structure 202. The structure 202 includes a set of rooms 204. The set of rooms 204 includes one or more rooms, such as room 206 and room 208. Although only two rooms are shown in this example, the set of rooms may include any number of rooms. For example, the set of rooms may include a single room, as well as three or more rooms.

A set of hub devices is included within the monitored area 200. In this example, one hub device is included in each room. However, in other examples, a hub device may not be included in every room in the structure 202.

In this example, hub device 210 is included in room 206 and hub device 212 is included within room 208. The hub device 210 monitors a portion of the monitored area 200 which includes room 206. The hub device 210 in other examples also monitors an exterior portion of room 206.

The hub device 210 is communicatively coupled to light 214. The hub device 210 may be enabled to automatically turn on the light 214 when a user enters the room and turn off the light 214 when a user leaves the room 206 through exit 216. Hub device 210 may also operate light 214 depending on light levels detected by a light sensor that may be optionally coupled to or implemented within hub device 210, based on either a user presence or other pre-configured setting to turn a light on or off when a light level threshold is reached, for example. The exit 216 may be an exit out of the room into another interior portion of the structure 202 or an exit leading outside the structure 202. In this example, the exit 216 is a door leading out into a hallway or other interior portion of the structure 202.

In this example, the hub device 210 analyzes detected sounds to identify the sound of the door opening, footsteps entering or leaving the room, or other sounds indicating the presence of a user entering or exiting the room 206. In other examples, an associated presence detector may be used to detect a user entering or leaving room 206.

The room 206 in this example includes one or more microphone(s) 218 for detecting sounds originating within room 206 or within a proximity to room 206. The microphone(s) 218 in this example are located externally to the hub device 210. The hub device 210 communicates with the microphone(s) 218 via a network connection with the microphone(s). The hub device 210 receives sound data from the microphone(s) 218 and analyzes the sound data to detect sounds originating inside room 206 and sounds originating outside room 206 that are within a sound detection range of the one or more microphone(s) 218.

The room 206 in this example also includes one or more speaker(s) 220. The speaker(s) 220 are located externally to the hub device 210 in this illustrative example. The hub device 210 sends recorded sounds to the one or more speaker(s) 220 via the network connection with the speaker(s). The hub device 210 utilizes the speaker(s) 220 to amplify and play recorded sounds to one or more users via the one or more speakers in one or more rooms within the structure. In other examples, the hub device 210 also plays recorded sounds on one or more speakers located externally to the structure within the monitored area.

The hub device 212 in this non-limiting example includes one or more microphone(s) 222 and one or more speaker(s) 224 integrated within the hub device 212. The hub device 212 detects sounds within a proximity of the hub device 212 via the one or more microphone(s) 222. In some examples, the hub device 212 requests sound detection data from one or more other hub devices. The sound detection data is data associated with one or more sounds detected by a hub device. The other sound detection data received from the one or more other hub devices is analyzed by the hub device to identify the sound or determine an origin of the sound. In one example, sound detection data from a plurality of hub devices is analyzed to triangulate an origin point or source of the sound within the monitored area.

The hub device 212 plays one or more recorded sounds via speaker(s) 224 associated with room 208 or speaker(s) 220 associated with room 206. In other words, a hub device plays a recorded sound on speakers located within one or more rooms. The hub device optionally also plays recorded sounds on one or more speakers located within the monitored area 200 that are external to the room 208.

The room 208 in this example includes, without limitation, an exit 226. The exit may be an exit from the room, or an exit from the structure leading to an exterior 236 of the structure. In this example, the exit 226 is a door leading outside to the exterior 236. The hub device analyzes detected sounds to determine if a sound indicates an issue for notification, such as the door of exit 226 being opened at a time a user is known to be away, the sound of a door or glass being broken, or otherwise damaged during an attempted forced entry into the structure 202.

The room may optionally include one or more light(s) 228 or one or more windows, such as window 232. The hub device 212 is enabled to identify a detected sound, such as a sound of glass breaking, indicating the window 232 has been broken, and perform one or more actions to alert a user of the identified sound or issue.

In some examples, the room 208 includes one or more camera(s) 230 for capturing video or audio data. For example, cameras may be used to capture video of a user walking or moving for identification of the user, or may be used to capture video or audio in response to a detected sound identified as an issue associated with a record action to capture evidence of potential intrusion or other issues. The hub device may perform an analysis of the video data of the user walking or audio data of the user's footsteps, for example, to determine a gait of a user, and store the identified user gait data for later user identification based on the user's gait.

In other examples, gait recognition is used to track users around the monitored area. As the users walk between rooms, their gait is assessed to identify the user. Gait includes the user's length of stride, footsteps, movement of the user's head as they walk, movements of arms as they walk, etc. Gait recognition is capable of working with very low quality cameras and is capable of recognizing a user even when the user does not face the camera. Gait recognition is utilized to identify users in some examples.

The hub device 212 in this example utilizes one or more presence sensor(s) 234. A presence sensor is a sensor for detecting a presence of a user within the room 208 or other portion of the monitored area 200. The one or more presence sensor(s) 234 in this example are located externally to the hub device 212. In other examples, one or more presence sensors are integrated within the hub device or physically connected to the hub device.

The exterior 236 portion of the monitored area 200 in this example includes one or more secondary structures, such as garage 238 and detached structure 240. The detached structure 240 may include, without limitation, a detached workshop, office, greenhouse, pool house, garden shed, storage building, tool shed, storm shelter, barn, or any other structure.

The exterior 236 in this non-limiting example also includes a set of lights 242. The set of lights 242 includes a set of one or more wireless exterior lights coupled to one or more hub devices. A hub device turns on the set of lights 242 in response to detecting a sound or presence of a user in an exterior 236 portion of the monitored area 200.

The exterior may include additional other features. For example, but without limitation, the exterior 236 of the monitored area 200 may include a porch 244, a driveway 246, a walk path, a fence, a gate, a fountain, a pond, a gazebo, or other unenclosed or partially enclosed features.

The exterior 236 may be monitored by one or more hub devices located within the structure 202 or one or more hub devices located outside the structure, such as hub device 248. The hub devices located within the structure or outside the structure 202 in this non-limiting example communicate with one another via a LAN. When one hub device detects a sound, the hub device sends a signal to wake or activate one or more other hub devices via the LAN 250. The signal to wake one or more other hub devices is a signal to other hub devices to switch from a sleep mode or semi-sleep mode to the active mode.

When analyzing a detected sound, the hub device may determine whether or not the sound can be identified and whether or not the sound is expected. Identifying the sound may be performed in part by an analysis engine, such as analysis engine 120 in FIG. 1, using local or remote data sources to attempt to identify the sound, through matching, pattern recognition, or any suitable recognition scheme. Determining whether or not the sound is expected may be performed in part by an analysis engine using any combination of user profile data, monitored area profile data, or machine learning data. For example, initially a hub device may determine a sound is expected by virtue of a profile setting indicating one or more expected sounds for the monitored area, or one or more expected sounds associated with a time period or date range for the monitored area. As an example, monitored area profile data may indicate that a domestic animal inhabits the monitored area and identified sounds associated with the domestic animal are to be expected. As another example, user profile data may indicate that the monitored area is a weekend home or vacation home and that sounds associated with an inhabited space are to be expected at given times, but are to be unexpected at other times. Over time, as the machine learning component of a hub device gathers data, such as telemetry data, the analysis engine may use the machine learning data to determine whether or not a sound is expected based on user habits, learned patterns associated with the monitored area, or any other learned data, for example. Additionally, analysis engine may access or obtain a list of identified sounds that are to be treated as unexpected regardless of any other factor, such as the sound of glass breaking for example.

On determining the sound is an unexpected sound, the one or more hub devices performs an unexpected sound action. For example, if hub device 248 detects a sound and identifies the sound as the sound of glass breaking originating near a window in set of windows, the hub device 248 performs an alarm trigger action. The alarm trigger action activates an alarm in a set of alarms 254 to alert a user of the window breaking. In other examples, the unexpected sound action may be to alert a user, either through sound amplification via one or more hub devices or through a notification, such as a notification sent to a mobile device of the user when it is determined that a user is not present in the monitored area. In yet other examples, the alert may include a tactile alert, such as a vibration via a mobile or wearable device, or a visual alert in addition to an audible alert.

The set of alarms 254 is a set of one or more alarms associated with the monitored area 200. The set of alarms in some examples includes one or more smoke alarms, carbon monoxide detectors, radon detectors, burglar alarms, medical alert alarms, or any other type of alarm.

In other examples, the monitored area 200 includes the set of hub devices communicatively coupled to devices and sensors, such as, but without limitation, an array microphone, a set of speakers, a set of light sensors, a thermometer for temperature detection, a presence sensor, IR emitter, device controls, or a battery. The array microphone may optionally be used to detect a sound, and where necessary, the audio it picks up will be encoded into a digital format. The digital audio may be streamed to the correct connection.

In one non-limiting example, a hub device 212 is placed in the room 208 with the presence sensor 234 able to scan all or the majority of the room. The hub device 212 may function on its own to monitor just the one room or multiple hub devices may each be placed in multiple different rooms to monitor those rooms, as well as work together to monitor the whole home.

In another example, on initialization, the hub device 210 uses AllJoyn to find other hub devices in the set of hub devices on the network. If another hub device is found, the hub device 210 copies the configuration locally and stores information about the other hub devices. If no other hub devices are found, the hub device 210 begins the setup. During installation, a user may install a hub application on a user device, such as a mobile computing device or wearable device, that will receive notifications about the status of the monitored area. The hub device 210 in this example guides the user through configuration using commands from the built in speaker(s) 220.

The hub device 212 may request a walk or otherwise to be physically moved around the room to configure the presence sensor or verify the presence sensor is able to see the entire room or a threshold portion of the room. The presence sensor is used exclusively in this non-limiting example. In another example, the hub device(s) may request the user walk from room to room through all available exits/entrances to generate mapping data as each of the one or more devices detects the presence of the user. The mapping data is utilized by the mapping component in generate a map of the layout of the structure 202 or exterior portions of the monitored area. The map may be used to predict the user's movement or track the user around the structure 202. When the user walks into a room, the presence sensor 234 is triggered. When the user walks out of the first room and into the second room, the presence sensor of a hub device in the second room is triggered indicating the user's presence in the second room. At the same time, the presence sensor in the first room detects the absence of the user in the first room.

In another example, the hub device 210 utilizes AllJoyn to communicate with the hub device 212. One of the hub devices takes the role of the hub controller. If the hub controller goes down or becomes non-functional, the hub controller role moves to another hub device via a failover mechanism. For example, the next hub controller may be selected via an election mechanism, selection of the most used hub device, or via a pre-selected hub device designated by a user or administrator as the next hub controller. This hub controller gathers sensor data from a plurality of sensors or one or more other hub devices in a plurality of hub device. The hub controller determines a pattern of the layout of the structure 202 based on this data to generate a map of the monitored area. The map is shared with the other hub devices.

In some examples, when a user walks into an unoccupied room, the user's presence is detected by the presence sensor 234. The presence sensor 234 checks whether the system is "locked." The system is locked when the monitored area is unoccupied or when there is little or no user activity, such as during the night. The system locks in some examples when the home is not occupied, such as the way a burglar alarm is set. In this non-limiting examples, if the system is not locked, a light sensor takes a reading. If the light level threshold is not reached, the set of hub devices switches on one or more lights. In some examples, the light(s) may be switched on via a Bluetooth light switch. In other examples, the hub device is built into the light switch or light fitting.

A hub device contained within a light switch housing, in some examples, may be packed into a light switch that replaces the current light switch. Depending on the wiring within the structure, a light switch housing is provided to power the device and control the light as well. In other examples, the hub device may be contained within a ceiling light fitting. Replacing the ceiling light fitting with a hub device allows the hub device to obtain power and control the light from the single device. A ceiling position provides better visibility to the entire room to detect presence of a user. A ceiling position may also provide a smoke detector sensor included within the hub device as well. For areas which are not occupied long term, such as hallways, a smaller less expensive smart room device could be available with less emphasis on audio and more emphasis on controlling the lights.

In other examples, a thermometer takes an immediate reading. The system begins any heating/cooling activity, if necessary, by switching on air conditioning (AC), or switching on central heating if the room needs to be warmed up, based on the detected user presence by a hub device. In some examples, a thermostat is replaced by a simple Bluetooth/wireless switch controllable from one or more hub devices. In other examples, the mobile companion application utilizes the location of users outside the monitored area, detected from the location of the user device, to determine when to go from monitoring extreme temperatures to actively maintaining comfortable temperatures for one or more users.

In other examples, the hub device ensures hot water is available when the home or other structure is occupied. In this manner, the hub device conserves energy and prevents wasted energy heating water when users are not home. In some examples, the set of hub devices take temperature readings at regular intervals. Users are notified when temperatures reach extremes and there is a risk, for example, pipes are in danger of freezing/bursting.

In one example, when a room is occupied, the hub device in that room monitors temperature at regular intervals to maintain temperature within a comfortable temperature range. The hub device(s) adjust the thermostat for one or more rooms based on temperature in other occupied rooms. If voice control is configured, the hub device listen for verbal commands. In other examples, if a hub application is configured on a user device in that room, commands from the user device control the room temperature, lighting, and other devices by default.

In some examples, when a user walks out of a room to leave it unoccupied, the fact there is no user presence in that room is detected and a hub device may take action accordingly. If the light is on, it is switched off, for example. The hub device in this unoccupied room notifies the other hub devices of its status over AllJoyn. Any media playing through speakers or attached audio equipment may continue to play until the user enters a room with another hub device, where, on detection of a user presence, the media will switch over to the newly occupied room. Any media playing in the unoccupied room stops and any audio equipment used to play it is turned off. In some examples, the lineout from the hub device to existing audio equipment would combine with an IR emitter to control the audio equipment (on, off, switch to line in, volume up, volume down). In other examples, the user could upgrade to compatible audio, such as an AllJoyn enabled device without utilizing an IR to control the device.

In other examples, after a set period of minutes of non-occupation in a room, temperature checking and monitoring is reduced to maintain temperature levels within a larger temperature range to reduce energy use while avoiding extreme temperatures. The hub device in the unoccupied room powers down to a sleep state. The hub device wakes from the sleep state to the active state when a user presence or other loud sound exceeding the sound level threshold is detected. Users may configure other items to switch off if they are still running, for example, switching the TV off in the unoccupied room using IR blasting through an IR emitter.

A hub system may be configured such that when no activity is detected and user devices running the hub application are located outside the monitored area, the user is notified that the system is "locked". The user in some examples explicitly locks the system from the user device. A "semi lock" mode may exist in some examples, such as at night where, after a certain time and with no activity detected in a particular "zone" (for example downstairs) the hub device(s) located in that zone go to the "semi lock" mode. A semi-lock mode in other examples is explicitly activated or selected by a user via the user device or other the hub device. The hub devices in the zone where the system is locked or semi-locked continue to monitor for presence and loud noises in a sleep mode. The sleep mode may be a lower power state. The hub device switches to an active mode when a sound or presence of a user is detected.

In some examples, during an active mode, the hub device listens for verbal commands, listens for sounds, regularly checks temperature and lighting, and other functions. The active mode is utilized when a room is occupied. During a semi-sleep or semi-lock mode, the hub device wakes when loud sounds occurs or when a presence of a user is detected. A semi-sleep mode is utilized when a room associated with a hub device is unoccupied but the monitored area is occupied by one or more users. In a sleep mode, the hub device monitors for sounds that exceeds a sleep mode threshold sound level. The sleep mode is utilized when the monitored area is unoccupied and the system is locked. During sleep mode, the hub device performs occasional temperature detection and presence detection. During de-activation mode, the hub device is turned off.

Figure 3:
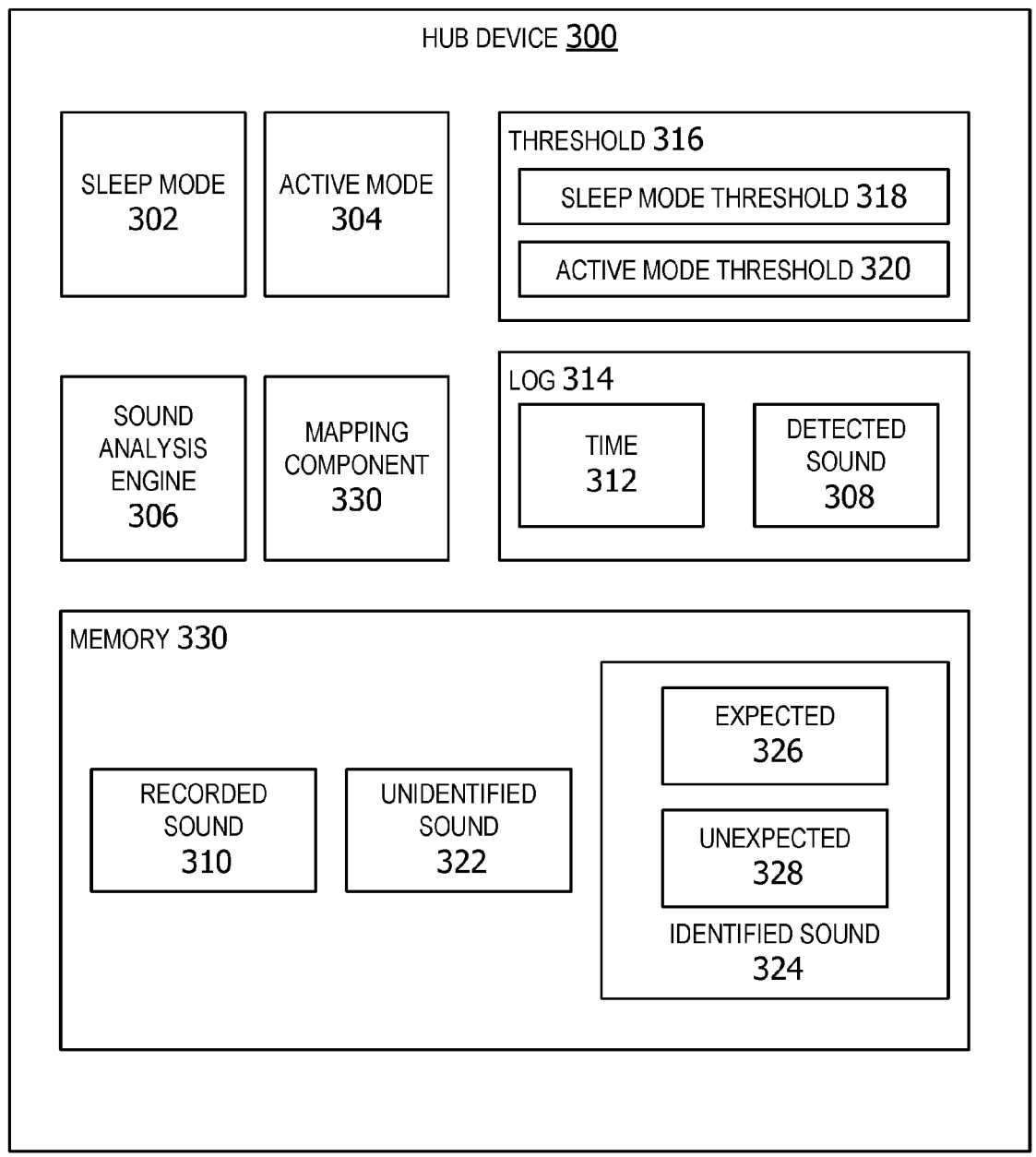
FIG. 3 is an exemplary block diagram illustrating a hub device.

FIG. 3 is an exemplary block diagram illustrating a hub device. The hub device 300 in this example is a hub device in a set of hub devices. The hub device in some examples is a hub controller.

The hub device 300 operates in a sleep mode 302 or an active mode 304. A sleep mode 302 is an inactive or stand-by mode. In some examples, a hub device switches to a sleep mode 302 when a monitored area is unoccupied, a room associated with the hub device is unoccupied, during hours when users are asleep or inactive, or after a threshold time without detecting a presence of a user within a proximity of the hub device.

The hub device 300 may switch to an active mode 304 upon detection of a presence of a user, upon receiving a wake up signal from another hub device, or upon detecting a change in the surrounding environment, such as a sound or movement. As an example, hub device 300 detects a sound and sound analysis engine 306 records the detected sound in a memory 330 or other data storage device to create a recorded sound 310. The sound analysis engine 306 logs a date and time 312 the detected sound occurred within a log 314.

In one example, the hub device 300 utilizes the log data for later analysis. In another non-limiting example, the log data is provided to a user for user review of detected sounds and the time the sound was detected. In still another example, the hub device utilizes the log data as data for machine learning of a user response to a detected sound at a given detected time.

The sound analysis engine 306 determines whether the detected sound 308 exceeds a threshold 316. The threshold may be a default threshold or a user defined threshold sound level. The threshold may include a sleep mode threshold 318 sound level that is applied to sounds that are detected by the hub device when the hub device is in a sleep mode. The threshold may also include or an active mode threshold 320 sound level that is utilized when a sound is detected during an active mode of the hub device.

If the sound is detected during a sleep mode, the sound analysis engine 306 compares the sound to a sleep mode threshold 318. If the sound is detected during an active mode, the sound is compared to an active mode threshold 320. In this example, the sleep mode threshold 318 is a lower threshold than the active mode threshold 320.

If the sound falls below the threshold 316, the sound analysis engine 306 ignores the sound. If the sound equals or exceeds the threshold and the sound originated within the monitored area, the sound analysis engine analyzes the sound to identify the sound. If the sound originated outside the monitored area, the sound analysis engine 306 ignores the sound and takes no further action. In some examples, the sound analysis engine returns to a sleep mode.

In some examples, the hub device includes a main loop that reads in from sensors, such as microphones and presence sensors, at designated intervals, such as every five minutes when the room is occupied and every thirty minutes when the room in unoccupied. During this loop, one or more microphones, such as a built in array microphone, is used to monitor current sound levels. The hub device uses the average level as the background sound level. The hub device establishes a threshold for activation, for example at around 20-30 db above the background sound level. When a loud noise is detected and the threshold passed, the hub device is activated. When activated, the hub device continues to record the sound to a buffer until the buffer is full. In one example, the buffer is a three second buffer. The hub device also records the exact time of the sound detection in log 314.

The hub device analyzes the sound to identify the sound if possible and determine whether an alert or notification will be generated for the detected sound. In one non-limiting example, the hub device reads the recording from the buffer for processing. The hub device determines which hub device detected the sound first. Determining which hub device first detected the sound may be used by the hub system not only to determine an origin of the sound relative to a monitored area, but may also be used to determine which hub device in a set of hub devices is to be used for notification of the detected sound, for example. The origin of the sound may include the time the sound originally occurred or the location in the monitored area at which the sound occurred. The hub device optionally determines if the sound is still occurring. If the sound is a repeating or recurring sound, this may indicate the sound is an alarm.

When the sound analysis indicates a recurring sound, such as an alarm, the hub device analyzes the sound to determine characteristics of the alarm, such as, but without limitation, frequency, gaps between pulses, gaps during pulses, length of repetition of the sound, and so forth. These characteristics are matched against known alarm sounds in a database of pre-identified sounds to determine the type of alarm. If the sound is identified as an alarm, the hub device may remain in an active mode until the alarm is canceled by an authorized user. When the alarm is cancelled, the hub device optionally returns to the sleep mode.

If the sound is not a recurring or repeating sound, the hub device may compare the sound against known sounds, such as window breaking patterns, doors opening, windows opening, objects fallings, footsteps, and so forth. If the sound is an unidentified sound 322, the hub device 300 sends a notification of the unidentified sound 322 to at least one user. An unidentified sound is a sound having a cause that is unknown or an undetermined type of sound. The notification in this example optionally includes the recorded sound, the time 312 the sound occurred, and an origin of the sound if the origin is known.

If the sound analysis engine is able to identify the sound and the sound is expected 326, the sound analysis engine ignores the sound and takes no further action. An expected sound is a sound that is typical, routine, or expected. In some examples, an expected sound includes a barking dog where a dog is known to reside within or near the monitored area, a door opening at a time when a user typically returns home from work, a sound of an alarm clock going off at the same time every morning, a tea pot whistling, microwave beeping, or any other expected or routine sound. The hub device may dynamically generate a database of expected sounds over time via machine learning processes as the device monitors the area and detects patterns associated with the area or a user.

If the sound analysis engine determines the sound is an identified sound 324 that is unexpected 328, the sound analysis engine performs an action to notify a user of the identified and unexpected sound. An unexpected sound could include a sound of a window or glass door breaking, a window opening when no user is present inside the structure, etc.

If the hub device 300 determine that a notification of a detected sound is to be sent to a user, the hub device may send a notification of the unexpected sound to a user device or amplify the sound and play the amplified sound on one or more speakers located within the monitored area, or both. If the hub device determines that no users are present within the monitored area and hub device is in a locked state, which may be a security activated state in which an alarm is triggered if an unexpected sound is detected, the hub device activates an alarm, such as a security alarm, fire alarm, or other associated safety alarm. The alarm in some examples is triggered in addition to sending the notification or playing the amplified sound.

Figure 4:
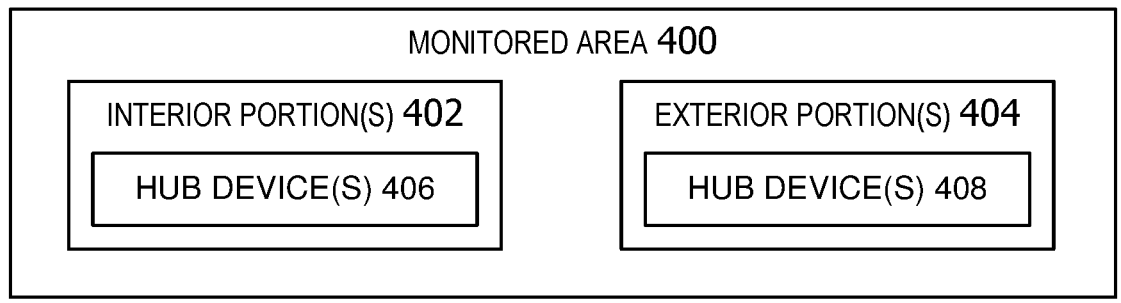
FIG. 4 is an exemplary block diagram illustrating a monitored area having at least one interior portion and at least one exterior portion.

FIG. 4 is an exemplary block diagram illustrating a monitored area having at least one interior portion and at least one exterior portion. A monitored area 400 in some examples include one or more interior portion(s) 402 of one or more structures and one or more exterior portion(s) 404 of the one or more structures. In this non-limiting example, one or more hub device(s) 406 monitors one or more interior portion(s) 402 of the structure. One or more hub device(s) 408 monitors one or more exterior portion(s) 404 of the structure.

Figure 5:
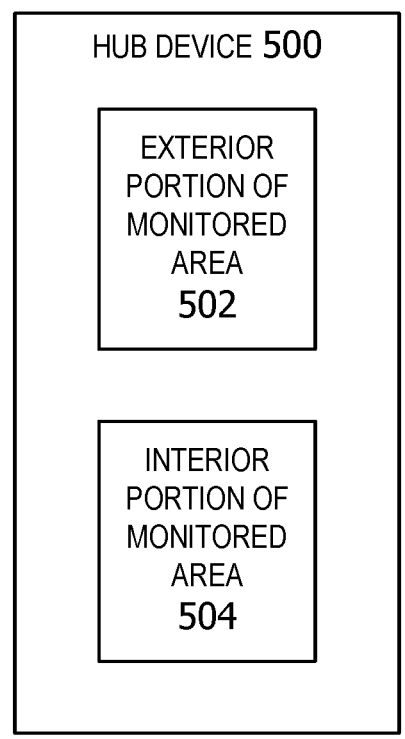
FIG. 5 is an exemplary block diagram illustrating a hub device monitoring an interior portion and an exterior portion of a structure.

FIG. 5 is an exemplary block diagram illustrating a hub device monitoring an interior portion and an exterior portion of a structure. In this example, a single hub device 500 monitors an exterior portion of a structure 502 and an interior portion 504 of the structure.

Figure 6:
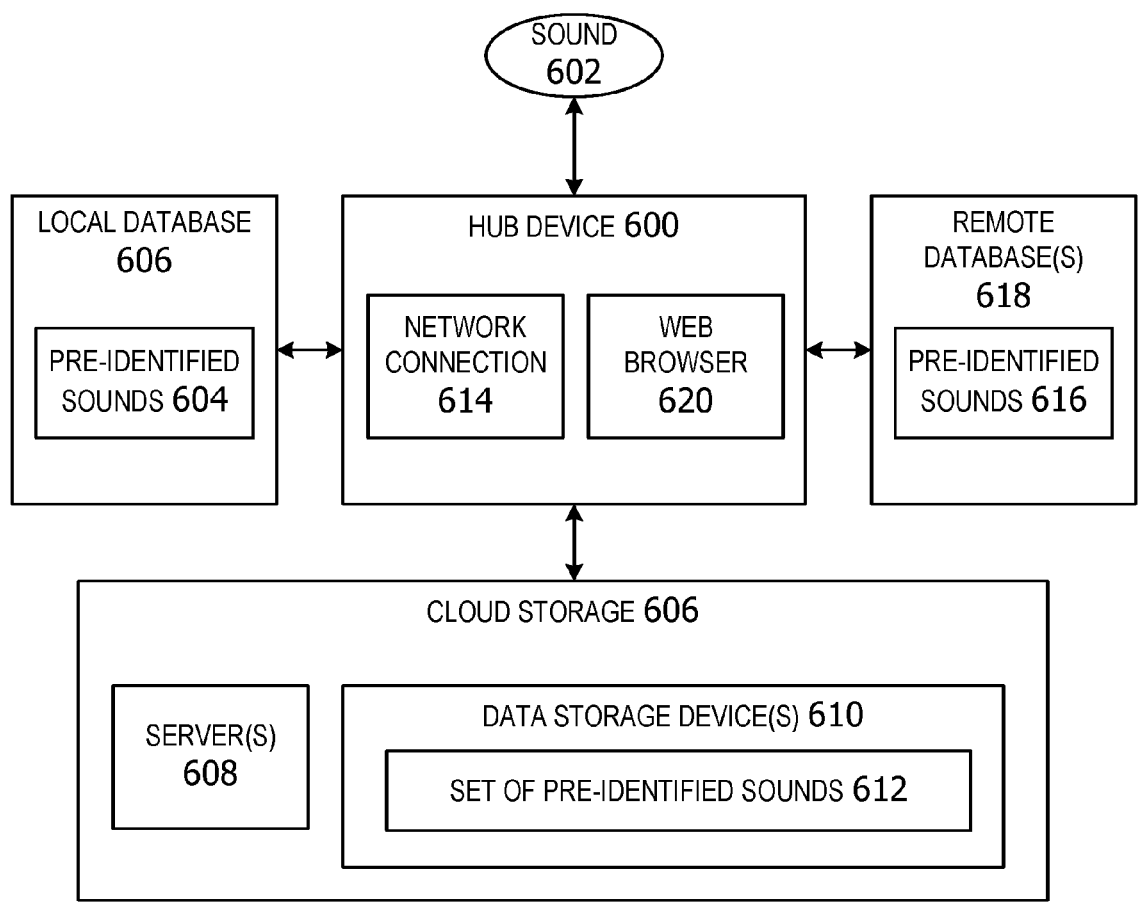
FIG. 6 is an exemplary block diagram illustrating a hub device analyzing a sound against a set of pre-identified sounds.

FIG. 6 is an exemplary block diagram illustrating a hub device analyzing a sound against a set of pre-identified sounds. The hub device 600 detects a sound 602. The hub device 600 compares the detected sound 602 to one or more pre-identified sounds 604 stored in a local database 606. The local database 606 is a database located locally to the hub device. The local database may be stored in a memory or data storage of the hub device, or in a local memory storage device that is connected to or otherwise accessible to the hub device 600.

If the sound 602 matches or corresponds to a pre-identified sound, the hub device 600 determines if the sound is an expected sound. If the sound is unexpected, the hub device 600 notifies a user of the occurrence of the identified sound.

If the local database 606 does not contain a match, the hub device 600 connects to a cloud storage via a network connection 614. The cloud storage 606 optionally includes one or more server(s) 608 or one or more data storage device(s) 610. The one or more cloud storage devices store a set of pre-identified sounds 612. The hub device 600 compares the sound 602 to the pre-identified sounds stored on the cloud. If a match is found and the sound is identified, the hub device notifies a user if the sound is unexpected.

If the hub device fails to identify the sound based on the pre-identified sounds stored on the cloud, the hub device in some examples connects to the Internet via the network connection 614. The hub device 600 utilizes the Internet connection to obtain pre-identified sounds 616 stored on one or more remote databases 618 available from one or more Internet sources. In some examples, the hub device 600 utilizes a web browser 620 to connect to the one or more remote databases 618.

The hub device 600 compares the sound 602 to the pre-identified sounds obtained via the Internet connection. If the sound remains unidentified, the hub device 600 sends a notification of the unidentified sound to one or more users.

Figure 7:
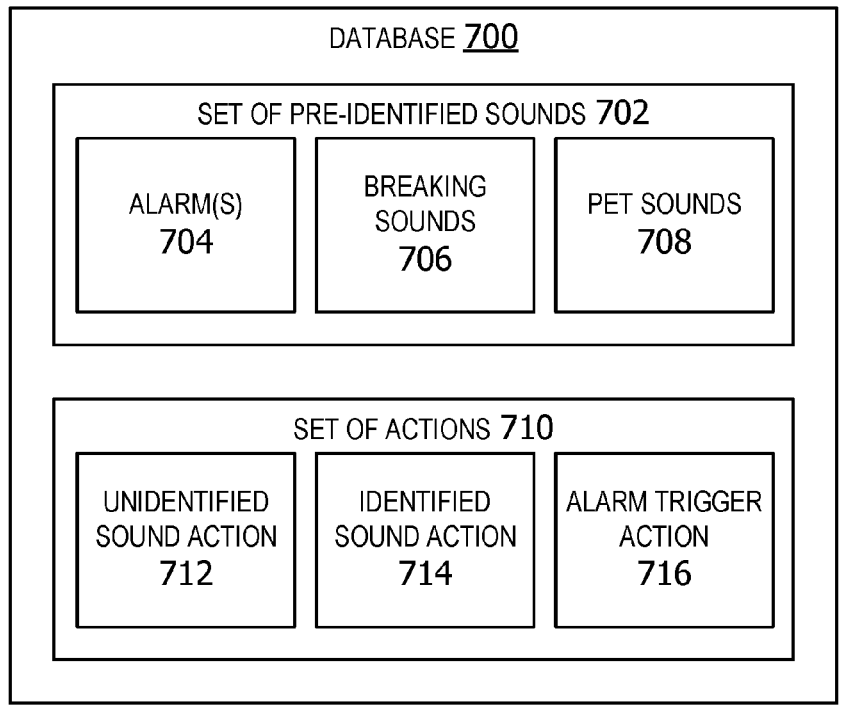
FIG. 7 is an exemplary block diagram illustrating a database of pre-identified sounds.

Turning now to FIG. 7, an exemplary block diagram illustrating a database of pre-identified sounds is shown. A database 700 is a data storage device for storing pre-identified sounds 702. The pre-identified sounds 702 may include any type of known sounds, such as alarm(s) 704, breaking sounds 706, or pet sounds 708. An alarm may include a smoke alarm, fire alarm, burglar alarm, car alarm, carbon monoxide alarm, open window alarm, tornado warning alarm, or any other type of alarm sound. The pre-identified breaking sounds may include, without limitation, a sound of breaking glass, breaking window, or any other type of breaking. Pet sounds 708 may include, without limitation, dog barking, cat meowing, bird chirping, dog scratching at door, or any other pet sounds.

The database 700 in some examples includes a set of actions 710 to be performed by the hub device. The set of actions 710 may include, without limitation, an unidentified sound action 712, an identified sound action 714, or an alarm trigger action 716. An unidentified sound action 712 in some examples includes sending a notification to a user. An identified sound action may include amplifying the sound and playing the amplified sound on one or more speakers. In other examples, the identified sound action includes sending a notification to a user device via a network. An alarm trigger action 716 may include playing the alarm on one or more speakers associated with the monitored area or sending a notification to a user device.

A hub device may identify loud continuous sounds within the monitored area using a microphone, such as an array microphone. The hub device may notify one or more associated hub applications that an existing, non-connected burglar alarm is sounding. Optionally, a small BLUETOOTH or wireless switch accessory may be installed on one or more existing burglar alarm devices to trip the alarm when a hub device detects a presence of a potentially unwanted or unauthorized person within the monitored area.

Figure 8:
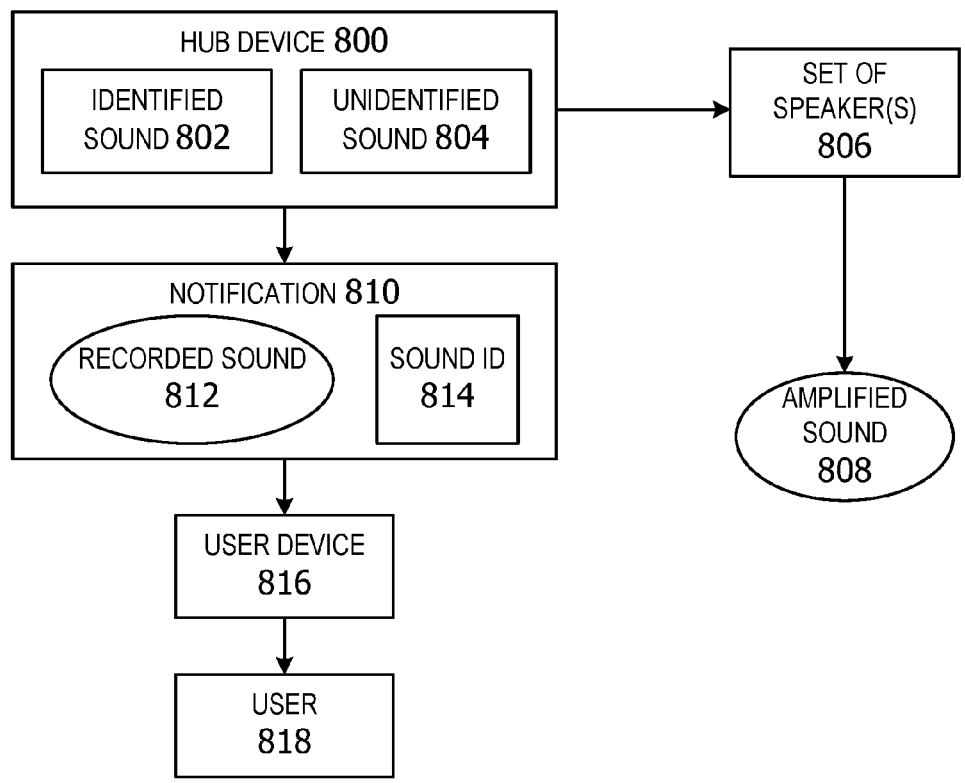
FIG. 8 is an exemplary block diagram illustrating a hub device performing a user notification action.

FIG. 8 is an exemplary block diagram illustrating a hub device performing a user notification action. Hub device 800 records a sound and analyzes the recorded sound to determine if it is an identified sound 802 or an unidentified sound 804. The hub device 800 may amplify the sound and output the amplified sound 808 on a set of speakers 806, send a notification 810 of the detected sound to a user device 816, or both. The notification in this examples may include the recorded sound 812 and an identification 814 of the sound. The notification 810 notifies the user 818 of the occurrence of the sound. The user may be located remote from the monitored area associated with the hub device 800 or within the monitored area associated with the hub device 800.

Figure 9:
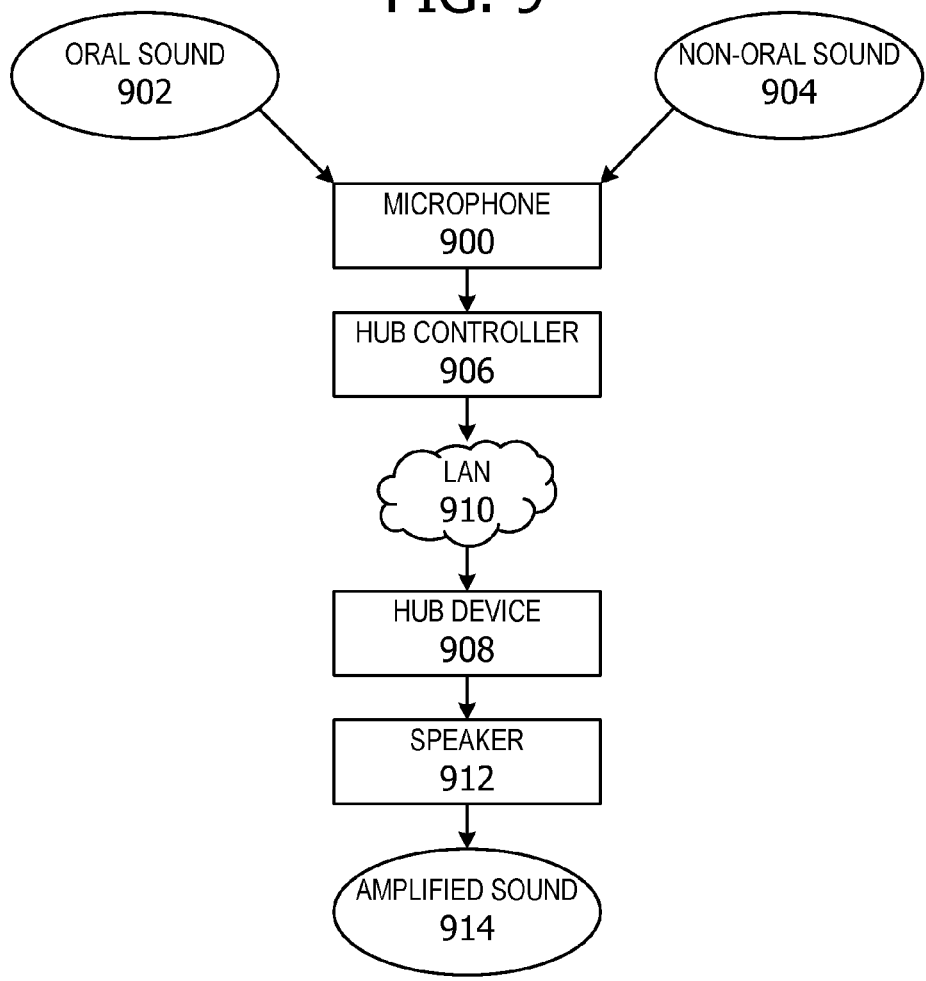
FIG. 9 is an exemplary block diagram illustrating detection of a non-oral sound by a hub controller.

FIG. 9 is an exemplary block diagram illustrating detection of a sound by a hub controller. A microphone 900 detects an oral sound 902 or a non-oral sound 904. An oral sound may be any sound connected with a human mouth, including verbal and non-verbal sounds. A verbal sound may refer to a sound corresponding to a spoken human language, such as a word or phrase or some other form of speech, for example. A non-verbal sound may refer to a sound emanating from or otherwise connected with a human mouth but not corresponding to spoken language, including, without limitation, paralanguage. A non-oral sound may be any sound other than a sound emanating from or connected with a human mouth. The hub controller 906 receives the sound from the microphone. The microphone may be integrated into or physically connected to the hub controller. In these examples, the hub controller 906 receives the sound directly from the microphone 900.

The microphone may alternatively be a separate device from the hub controller. In these examples, the hub controller connects to the microphone via the LAN 910. The hub controller 906 records the sound and sends a wake up signal to one or more other hub devices, such as hub device 908. The hub controller 908 sends the sound to the one or more other hub devices, including hub device 908.

Hub device 908 receives the recorded sound from the hub controller 906. The hub device 908 amplifies the sound and plays the amplified sound 914 on one or more speakers, such as speaker 912. The amplified sound 914 is audible throughout the monitored area, notifying users within the monitored area of the sound.

In one example, a sound of a window breaking is detected by a first hub device in a first room that is unoccupied. The first hub device sends a recorded copy of the window breaking sound to a second hub device 908 associated with a second room occupied by a user. The second hub device plays the amplified sound of the breaking window in the second room to notify the user of the window breaking. The user in the second room was unable to hear the original window breaking sound. The second hub device replaying the sound in the second room enables the user to hear the sound and become aware of the broken window. In other examples, the recorded copy of the sound may be sent via a notification to a mobile device or mobile application, in order to alert a user who is not present in the monitored area. Additionally, the identified sound may be used to further identify one or more resources that may be useful in addressing the sound, such as emergency personnel or local businesses that may address an issue, such as a window company for an identified sound of breaking glass for example.

In another non-limiting example, if the first hub device, located in a garage unoccupied by a user, detects the sound of a car alarm, the first hub device transmits the recorded sound to the second hub device located inside a user's home. The second hub device replays the sound of the car alarm in a room occupied by the user to notify the user of a potential problem with the car parked in the garage.

Figure 10:
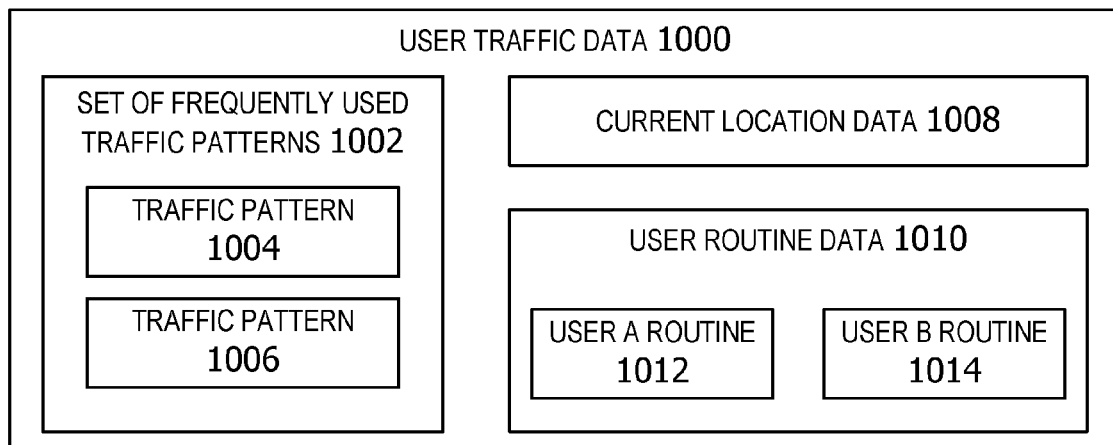
FIG. 10 is an exemplary block diagram illustrating user traffic data.

FIG. 10 is an exemplary block diagram illustrating user traffic data. The user traffic data 1000 is data associated with user movements within a monitored area. The user traffic data 1000 is gathered by a set of hub devices located within the monitored area and stored in memory, such as memory 118 in FIG. 1. The user traffic data 1000 in this example includes a set of frequently used traffic patterns. A user traffic pattern is a route or path through a monitored area used by a user. In one example, a path may include walking from a garage to a door into a house, through a hallway and into a kitchen.

In this example, the set of frequently used traffic patterns includes two user traffic patterns, traffic pattern 1004 and traffic pattern 1006. However, in other examples, the set of frequently used traffic patterns includes three or more different traffic patterns. The user traffic data 1000 may include current location data 1008 identifying a current location of one or more users. A current location of a user may be determined based on data from a camera, presence data from a presence sensor, voice data from a microphone, or other identifying data received from one or more sensors. A current location of a user may also be predicted by the machine learning component of the hub device, based on the map of the monitored area, the user traffic patterns, user routine, and other information associated with the user, such as user schedule or calendar data.

The user routine data 1010 is data associated with a user's schedule, normal routine, and typical actions. For example, a hub device may learn, via a machine learning component, that a user may always leave for work at approximately 7:30 a.m. and return home from work at approximately 5:30 p.m. The user may typically eat dinner in a dining room of the monitored area at approximately 7:00 p.m. and watch the news in a main living area at 10:00 p.m. The machine learning component utilizes this information to determine that a user is most likely located in the dining room at 7:15 p.m. even if there is no camera, presence sensor, microphone, or other sensor device located in the dining room.

Figure 11:
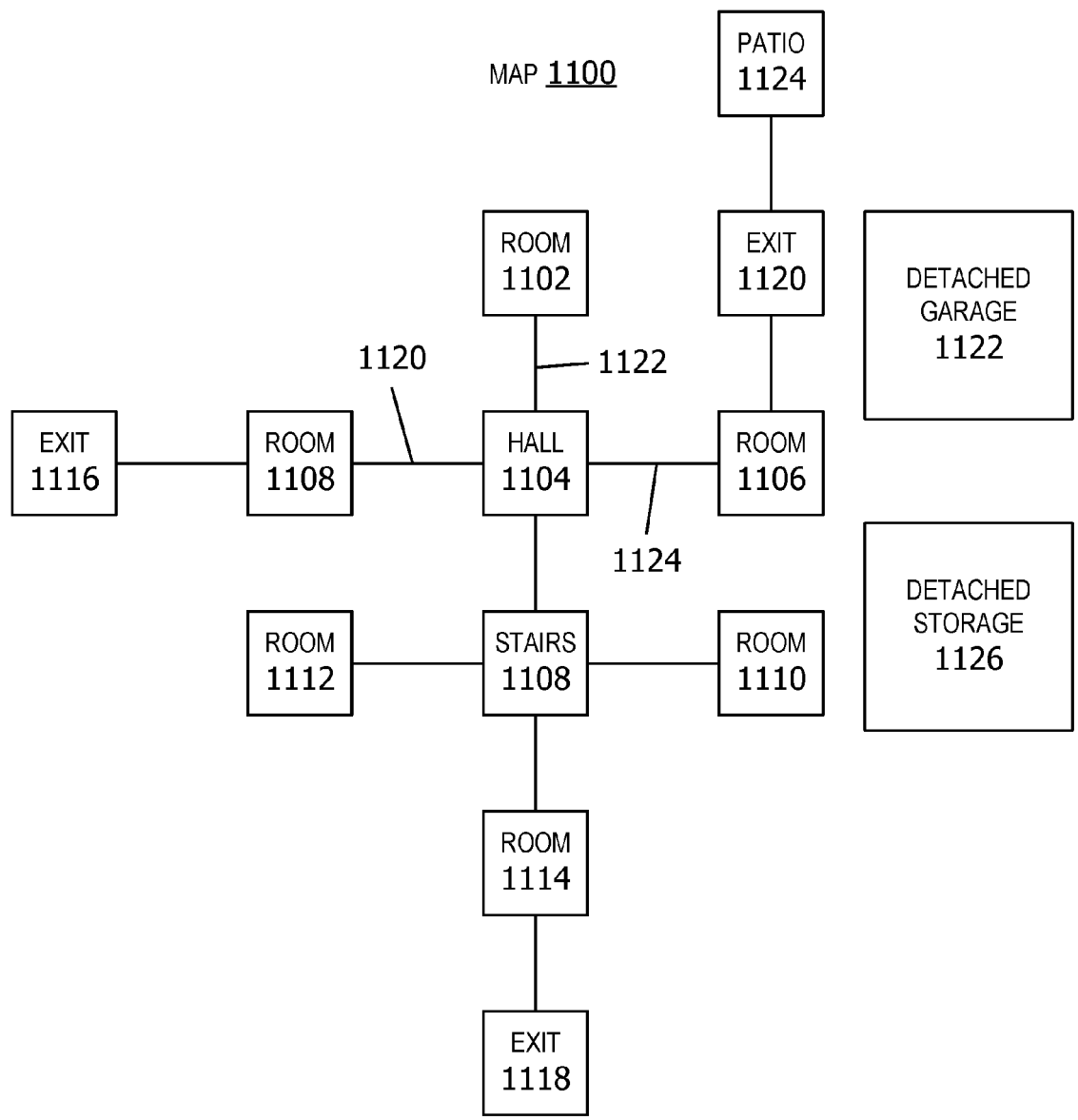
FIG. 11 is an exemplary block diagram illustrating a map generated by a set of hub devices.

FIG. 11 is an exemplary block diagram illustrating a map generated by a set of hub devices. The map 1100 is a map generated by one or more hub devices in a set of hub devices. The map includes a representation of one or more portions of the monitored area.

Map 1100 includes a set of rooms as an illustrative example. However, a monitored area may be subdivided into portions other than rooms, such as portions within range of a hub device in a set of devices, for example. The set of rooms depicted in map 1100 includes room 1102, hall 1104, room 1106, room 1110, room 1112 and room 1114. The map includes a representation of one or more exits from the one or more structures, such as exit 1116, exit 1118, and exit 1120. The map 1100 shows passageways 1120, 1122, and 1124.

Mapp 1100 shows an exemplary representation of a first floor of a two story structure. The map includes stairs 1108 leading up to the second floor. Map 1100 also includes a representation of exterior features and secondary structures, such as patio 1124, detached garage 1122, and detached storage 1126.

In an exemplary scenario, a set of hub devices detects when a smoke alarm has been triggered, either by detecting and recognizing the alarm sound or by a connected smoke alarm that communicates directly over Bluetooth or Wi-Fi with one or more of the hub devices for the monitored area. With a thermometer implemented on a hub device or communicatively coupled to one or more of the hub devices, if smoke is detected and one of the rooms is showing a temperature of 50 degrees Celsius or more, then the hub controller determines that a fire is considered to be near and becoming dangerously hot.

The hub controller may estimate a probable epicenter of the fire by comparing the temperatures in a plurality of rooms. The hotter rooms are determined to be closer to the fire. This provides an indication of which room is the center of the fire. The other hub devices are notified of the heat, especially as the particular hub device that's in the room on fire, will likely become inoperable due to fire and smoke damage. If the heat is detected at a particular node, room, or area, then that node, room, or area is dynamically removed from the potential safe routes through the structure. A new safe mode is calculated in real-time which avoids the removed area to determine the safest route under the current circumstances.

The hub device determines whether a safe route should be generated. This determination may be based on whether or not a user presence is detected in the monitored area, or predicted based on machine learning for example. The hub device may also determine whether to generate a safe route based on changes in an environment of at least a portion of the monitored environment. For example, if a smoke alarm sound and temperature changes indicate a fire in a portion of the monitored area, the hub device determines that a safe route for one or more users in the monitored area should be generated.

The hub device may also generate a safe route for the user based on a request from a user. The user request may be received from a user within the monitored area as well as a user outside the monitored area. For example, a user inside the monitored area may request a safe route out of the monitored area. In another example, an emergency responder outside the monitored area may request a safe route through the monitored area to a location of a user inside the monitored area to assist that user. This might occur, for example, with an elderly person, a child, an immobile person, an unconscious person, handicapped person, or other individual user unable to exit the monitored area without assistance.

The one or more hub devices may generate a safe route based on an event, such as an evacuation event. In an example in which an evacuation of the monitored area is advisable, the hub device generates a safe route from a user's current location to a different location. The different location may be a potentially safer location than the user's current location. The safe route in some examples is output to the user as a visual or graphical map, which may be displayed by a user device. For example, a safe route may include a path from room 1102 down passageway 1122 into hall 1104 through passageway 1120 to room 1108 and out the structure through exit 1116. This safe route enables users in a large building to find the fastest and safest route out of a structure, such as in a fire. In other examples, the safe route leads to a safe room or safe location within a structure inside the monitored area, such as in a tornado or hurricane in which it is safest to move to a basement, cellar or stairwell rather than exiting the structure. In still another example, the safe route leads from outside the monitored area to a room or other area inside the monitored area.

In some examples, the safe route is sent to a user's phone or audible route directions are provided over device speakers. In other examples, the map is sent to emergency personnel over connected monitored alarm system. In a large building or building complex, such as a dormitory, factory, office building, or other commercial setting, the set of hub devices provides a safe route to guide employees out in emergency scenarios using hub devices or user device.

Thus, in some examples, a safe route may be communicated to one or more users by automatically turning on any connected lights along the safe route by the hub controller. In another example, the hub controller may send auditory or verbal instructions or directions via one or more hub devices or user devices running the hub application. The instructions may verbally inform users of areas to avoid and nodes where fire is detected. The hub device(s) may optionally also verbally announce safe pathways and exits.

In a commercial setting, the hub system may provide visual indicators or directions leading to emergency exits, such as by manipulating or otherwise controlling networked lights, or via a light emitting diode (LED) light that may be optionally included in the hub device. The lights may be manipulated by one or more hub devices to direct people away from the exits that are blocked or lead people to the quickest route for egress of the monitored area, for example.

In the event of a detected fire, the hub device may automatically contact emergency services and provides the map and location data for any users still located within the building. This information permits emergency responders to be better prepared and informed regarding the emergency situation.

Map 1100 may also be utilized by the set of hub devices to track multiple people in the monitored area simultaneously. The set of hub devices creates the map during configuration and continues modifying and building the map dynamically in real time as the map is being used and one or more people are being detected by the devices.

Figure 12:
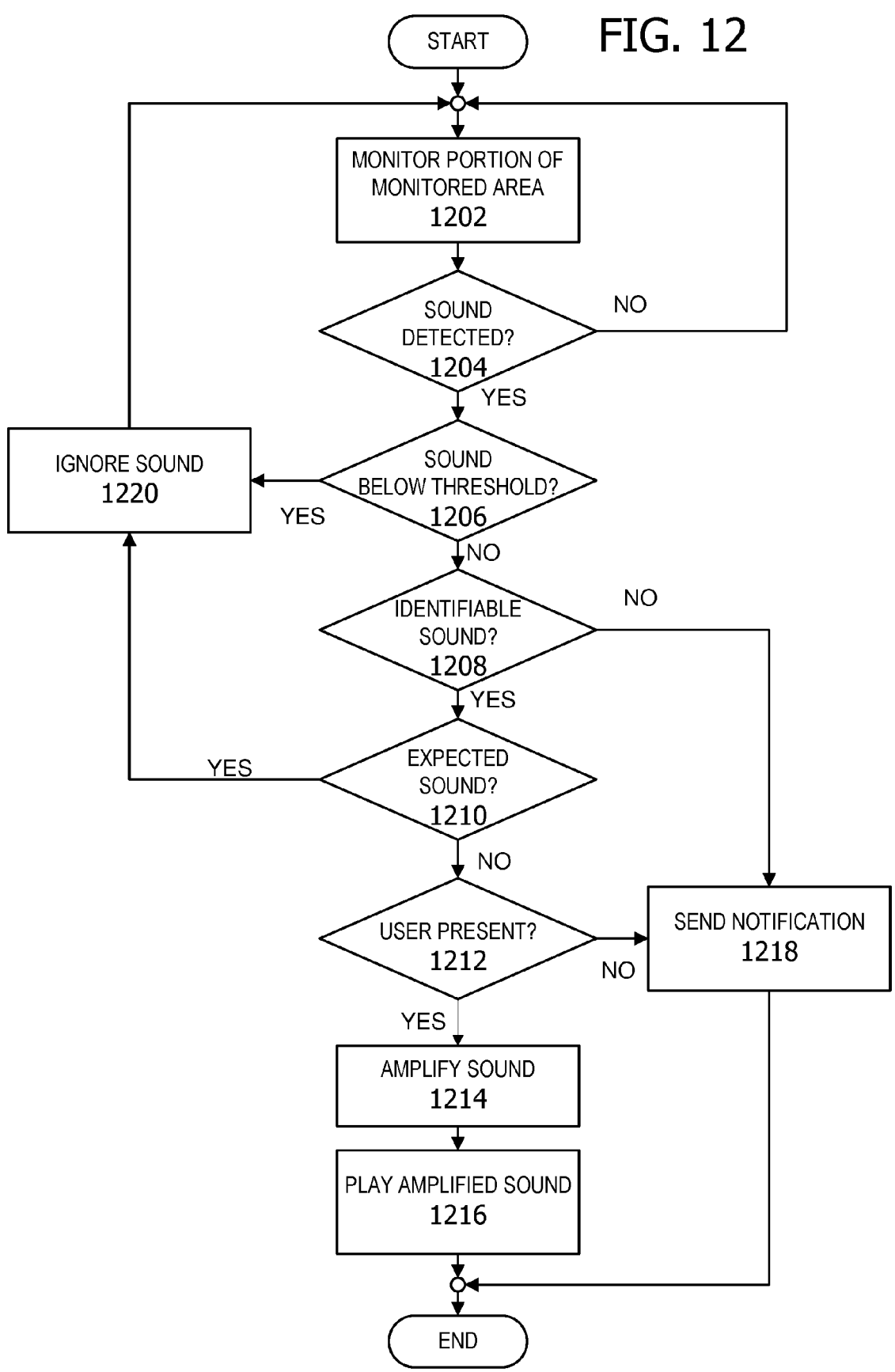
FIG. 12 is an exemplary flow chart illustrating operation of a hub device to monitor a portion of a monitored area.

FIG. 12 is an exemplary flow chart illustrating operation of a hub device to monitor a portion of a monitored area. The process shown in FIG. 12 may be implemented by a computing device, such as, but without limitation, hub device 102 or hub controller 104 in FIG. 1.

The process monitors a portion of a monitored area at operation 1202. The process determines if a sound is detected at operation 1204. If no, the process returns to operation 1202. When a sound is detected at operation 1204, the process determines if the sound is below a threshold at operation 1206. If no, the process determines if the sound is identifiable at operation 1208. If the sound is identifiable, the process determines if the identified sound is an expected sound at operation 1210. If the sound is not an expected sound, the process determines whether a user is present within the monitored area at operation 1212. If yes, the process amplifies the sound at operation 1214. The amplified sound is played at operation 1216. The process terminates thereafter.

Alternatively, if the sound is not an expected sound, and the process determines the user is present within the monitored area at operation 1212, yet the sound is not continued or repeating, a notification may be sent in lieu of an amplification process. In other examples, where the sound is unidentified and the user is present within the monitored area, the process may replay the sound via a hub device for identification of the sound by the user.

Returning to operation 1212, if a user is not present within the monitored area, the process sends a notification of the unidentified sound to a user device at operation 1218. The process terminates thereafter.

Returning to operation 1206, if the sound is below a threshold sound level at operation 1206, the process ignores the sound at operation 1220, and returns to operation 1202.

In the example of FIG. 12, the process determines if a user is present within the monitored area. In other examples, the process checks whether the hub controller is in a locked state. The locked state indicates the user is absent or unavailable.

In other examples, the process checks with one or more other hub devices to determine if the user is present somewhere within the monitored area. In other words, the set of hub devices communicate with one another to identify that a user presence is detected or undetected in any portion of the monitored area.

In this example shown in FIG. 12, the notification is sent if the user is not present. However, in other examples, the process makes a determination as to whether the notification should be sent. The process determines if a notification should be sent to one or more user devices. This determination is made based on one or more factors, such as the time of day, the type of sound, user preferences, system settings, or other factors. In other examples, the hub controller determines whether to send the notification based on machine learning over time for identifying sounds the user does not wish to receive a notification. This machine learning in some examples is based on a record of previous instances in which this same or similar sound was detected and identified as unexpected, a notification was sent, and the user ignored the notification or indicated the user did not want to receive a notification for that type of sound. The next time the machine learning component of the hub device detects that sound, even if unexpected, it will not generate a notification because it has learned the user is not interested in that particular sound occurring.

While the operations illustrated in FIG. 12 are described as being performed by a hub device, aspects of the disclosure contemplate that performance of the operations by other entities. For example, a cloud service may perform one or more of the operations in association with a hub device.

Figure 13:
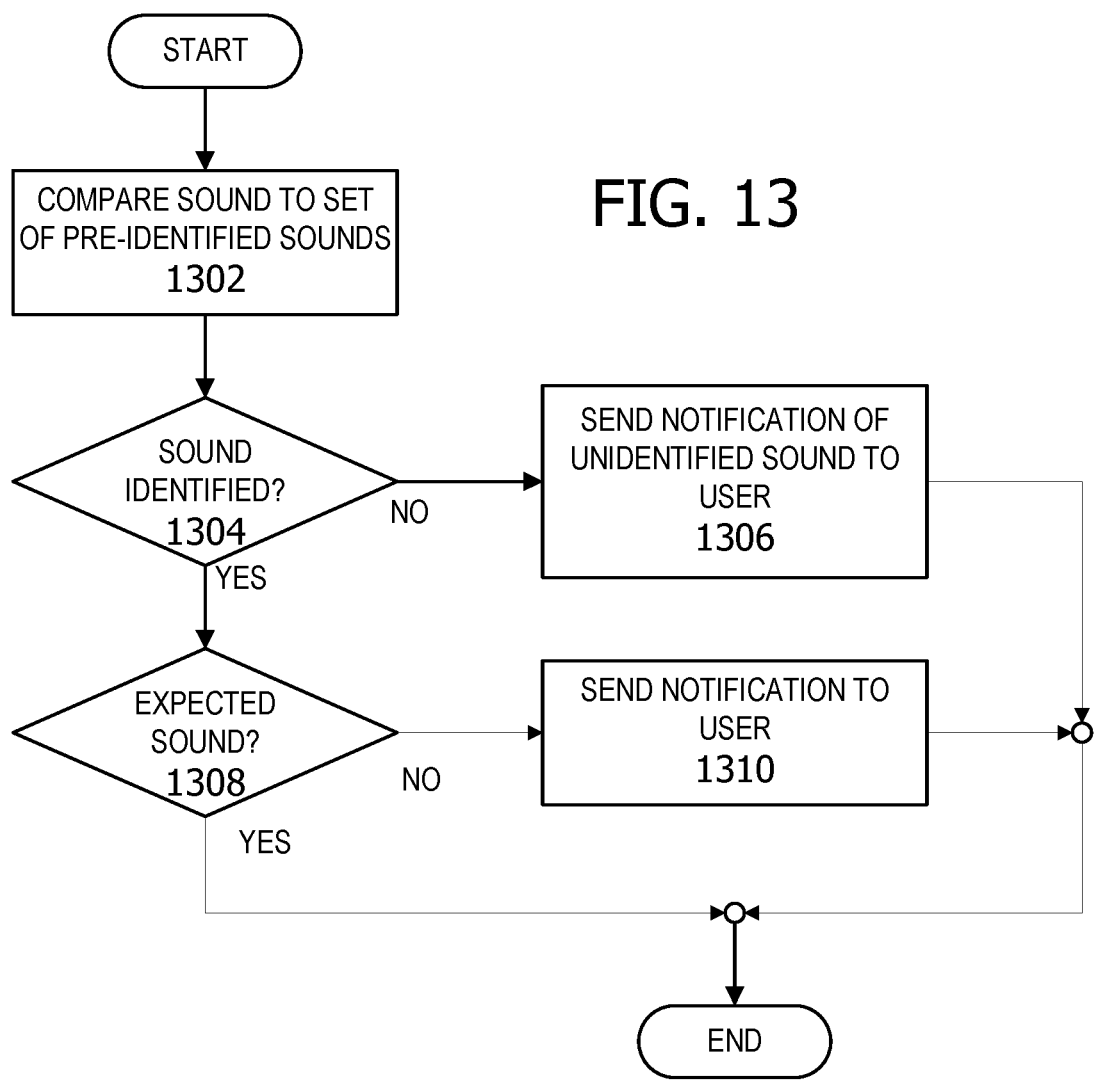
FIG. 13 is an exemplary flow chart illustrating operation of a hub device to identify a sound.

FIG. 13 is an exemplary flow chart illustrating operation of a hub device to identify a sound. The process shown in FIG. 13 may be implemented by a computing device, such as, but without limitation, hub device 102 or hub controller 104 in FIG. 1.

The process compares a sound to a set of pre-identified sounds at operation 1302. The process determines if the sound is identified at 1304. If the sound is not identified, a notification of the unidentified sound is sent to the user at operation 1306. This may provide an opportunity for a user to identify the sound, via a provided captured recording of the unidentified sound by the hub device included in the notification sent, such that the hub device receives an identification of the sound in response to the notification and stores the identification for future comparison, for example.

Returning to operation 1304, if the sound is identified the process determines if the sound is expected at operation 1308. If the sound is an expected sound, the process terminates thereafter.

Returning to operation 1308, if the sound is not an expected sound the process sends a notification to a user at operation 1310, with the process terminating thereafter. In some examples, the notification may be a notification sent via a network to a user device or other device associated with a user remote from the hub device and monitored area. In other examples, the notification may be an amplification of the sound via one or more other hub devices or one or more speakers associated with the monitored area when a user presence is detected in the monitored area. In still other examples, a notification may be sent to another designated user in addition to the user associated with the monitored area, such as a designated emergency contact or emergency personnel.

While the operations illustrated in FIG. 13 are described as being performed by a hub device, aspects of the disclosure contemplate that performance of the operations by other entities. For example, a cloud service may perform one or more of the operations in association with a hub device.

Figure 14:
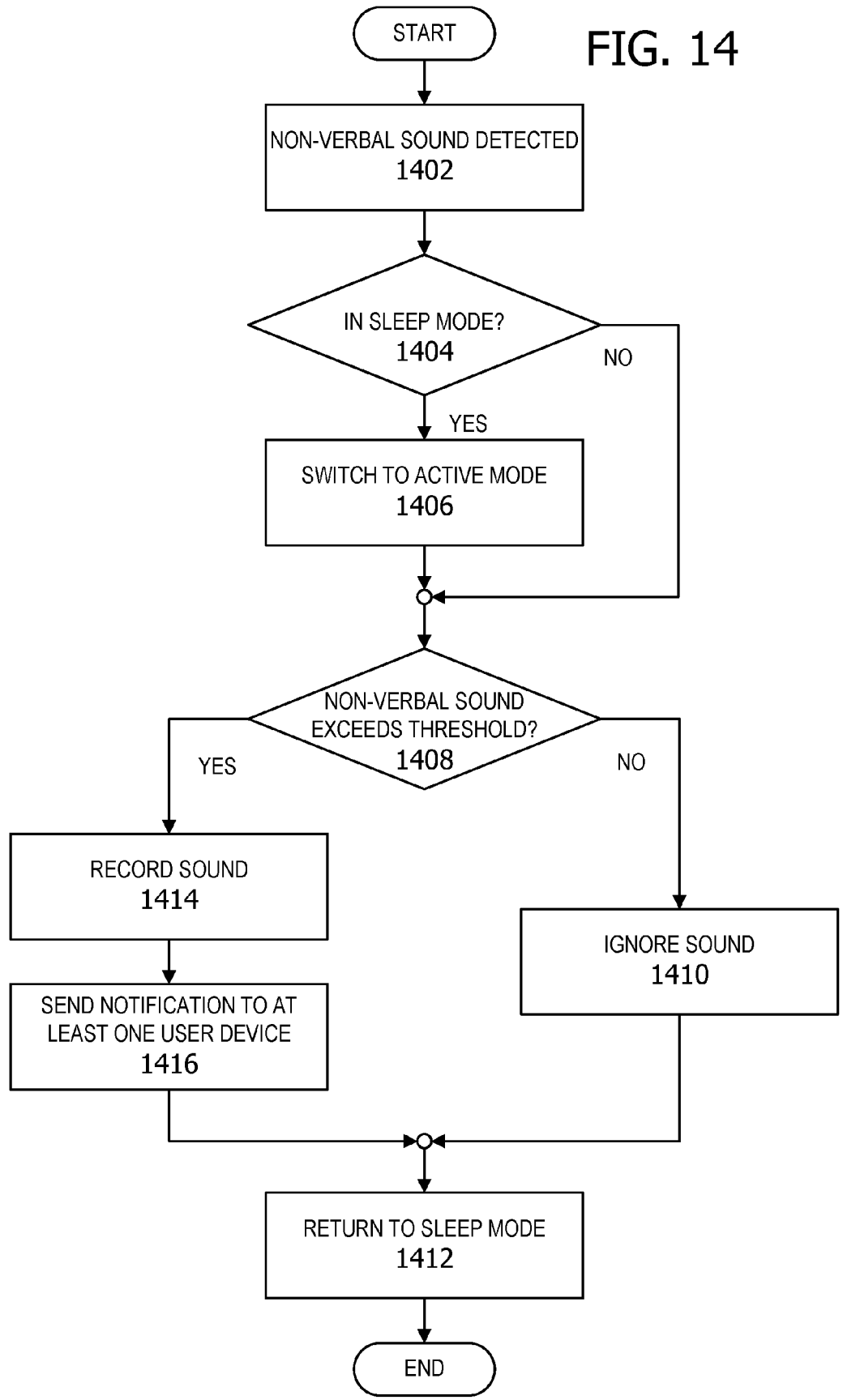
FIG. 14 is an exemplary flow chart illustrating operation of a hub device detecting a sound in sleep mode.

FIG. 14 is an exemplary flow chart illustrating operation of a hub device detecting a sound in sleep mode. The process shown in FIG. 14 may be implemented by a computing device, such as, but without limitation, hub device 102 or hub controller 104 in FIG. 1.

The process detects a non-oral sound at operation 1402. Examples of a non-oral sound may include an animal sound, such as a barking dog, the sound of two objects coming together, chimes, rings, alerts, and other audible sounds produced by a thing or object or caused indirectly by a thing or object. The process determines whether the hub device is in a sleep mode at operation 1404. If yes, the process switches to an active mode at operation 1406. The process determines whether the non-oral sound exceeds a threshold at operation 1408. If no, the process ignores the sound at operation 1410 and returns to a sleep mode at operation 1412. The process terminates thereafter.

Returning now to operation 1408, if the non-oral sound exceeds the threshold, the process records the sound at operation 1414. The process sends a notification to at least one user device at operation 1416. The user device may be another hub device in some examples. In other examples, the user device may be a wearable device or mobile phone capable of receiving the notification from the originating hub device.

While the operations illustrated in FIG. 14 are described as being performed by a hub device, aspects of the disclosure contemplate that performance of the operations by other entities. For example, a cloud service may perform one or more of the operations in association with a hub device.

Figure 15:
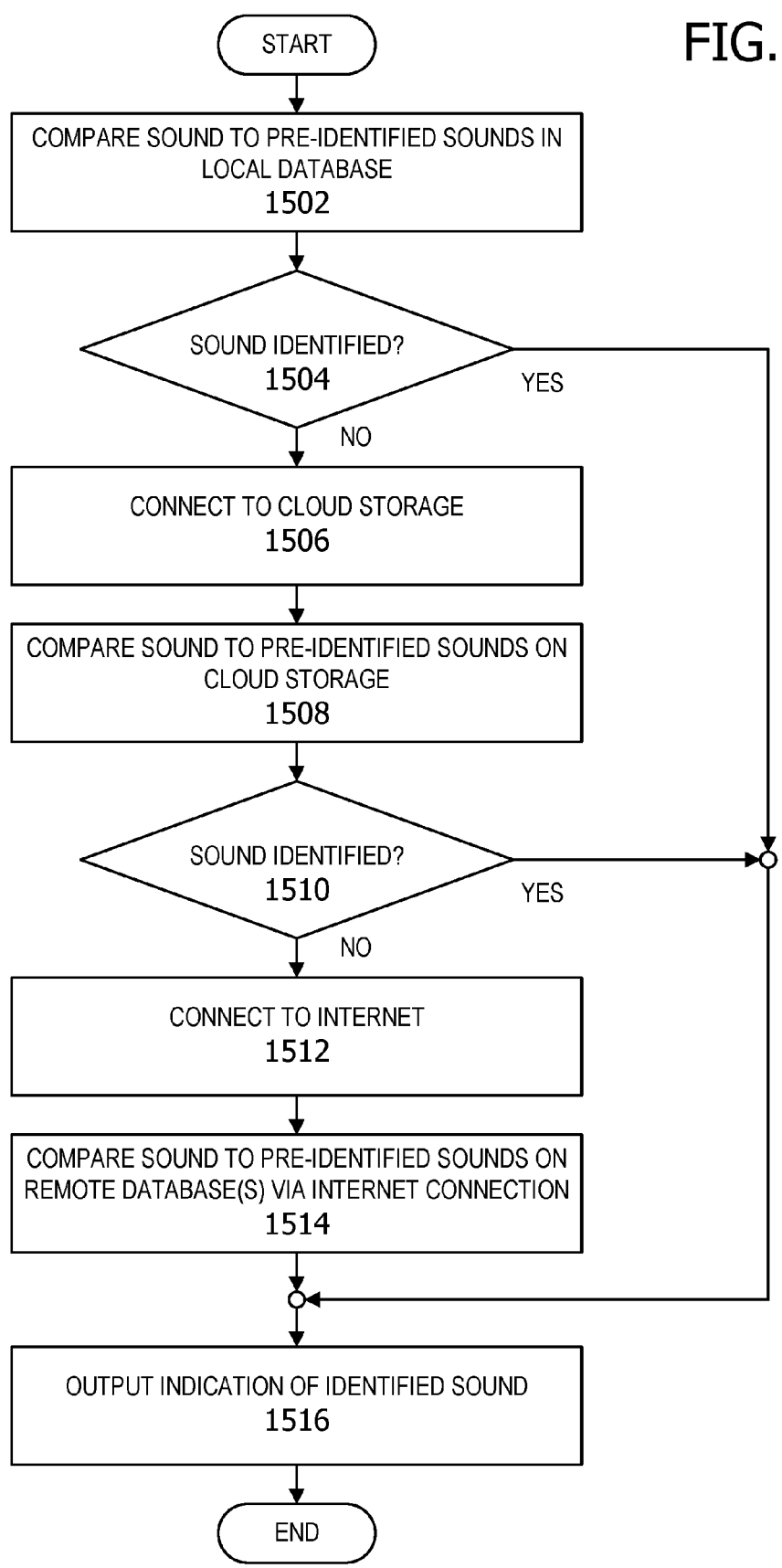
FIG. 15 is an exemplary flow chart illustrating operation of a hub device identify a sound based on a set of pre-identified sounds.

FIG. 15 is an exemplary flow chart illustrating operation of a hub device identify a sound based on a set of pre-identified sounds. The process shown in FIG. 15 may be implemented by a computing device, such as, but without limitation, hub device 102 or hub controller 104 in FIG. 1.

The process compares a sound to pre-identified sounds in a local database at operation 1502. The process determines whether the sound is identified at operation 1504. If the sound is identified, the process outputs the results of the sound identification analysis at operation 1516. The process terminates thereafter.

If the sound is not identified at operation 1504, the process connects to a cloud storage at operation 1506. The sound is compared to pre-identified sounds on the cloud storage at operation 1508. If the sound is identified at operation 1510, the process outputs the results of the sound identification analysis at operation 1516. The process terminates thereafter.

If the sound is not identified at operation 1510, the process connects to the Internet at operation 1512. The process compares the sound to pre-identified sounds on one or more remote database(s) via the Internet connection at operation 1514. The process outputs the results of the sound identification analysis at operation 1516. The process terminates thereafter.

In the example shown in FIG. 15, the process outputs the results of the sound identification analysis. The output results in this non-limiting example include an indication of whether the sound is identified or the sound remains unidentified.

For example, if the sound is identified, the process may output the sound identification results to the sound analysis engine of a hub device to determine what action to perform as a result of the sound identification or the failure to identify the sound by the sound identification analysis.

In another example, outputting the results of the sound identification analysis includes sending a notification of the identified sound to a hub device when the sound identification indicates a safety or security issue, such as a glass breaking sound, a door breaking sound, an alarm, or other sound identified as indicating a potential issue requiring further action.

In still another non-limiting example, outputting the results of the sound identification analysis includes sending the identified sound results or the unidentified sound results to one or more hub devices or to a user device depending on actions determined by the hub device analysis engine and the action database.

In another non-limiting example, if the sound is not identified, the process outputs the occurrence of the unidentified sound to the one or more hub device or to the user device.

In another example, if the sound is unidentified, outputting the results of the sound identification analysis may include sending a recording of the sound to a user for user identification.

While the operations illustrated in FIG. 15 are described as being performed by a hub device, aspects of the disclosure contemplate that performance of the operations by other entities. For example, a cloud service may perform one or more of the operations in association with a hub device.

Figure 16:
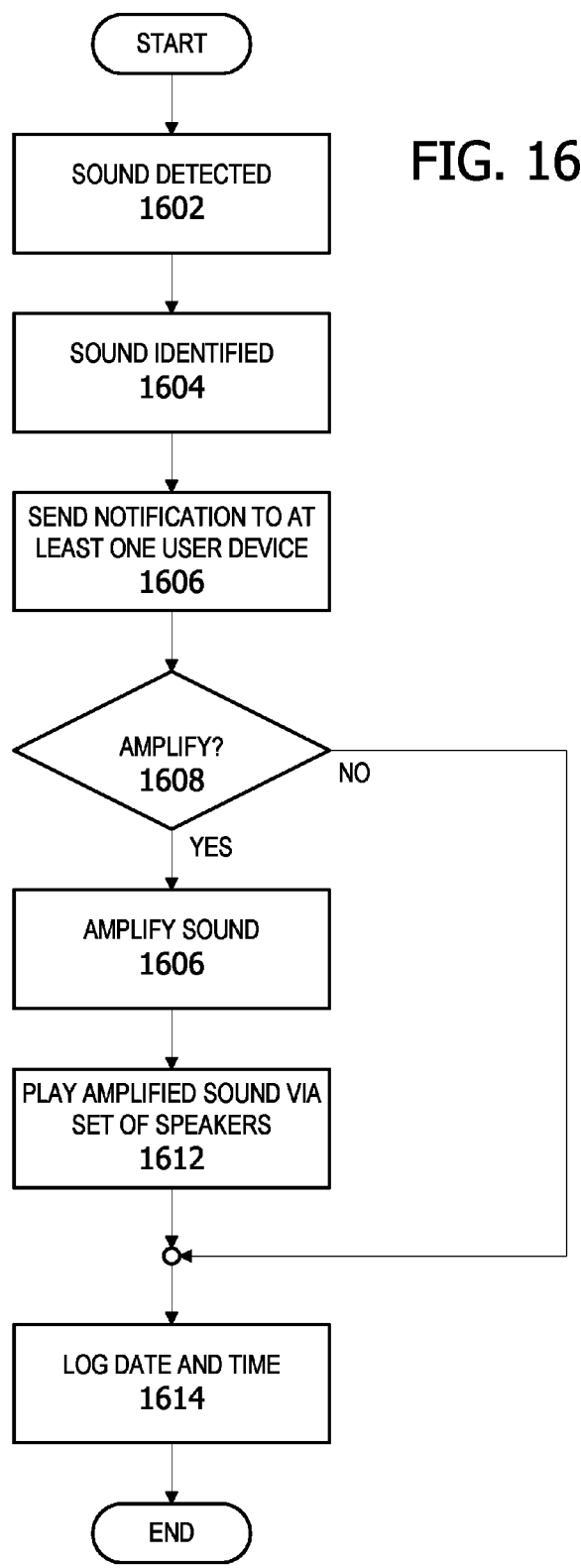
FIG. 16 is an exemplary flow chart illustrating operation of a hub device detecting a doorbell sound.

FIG. 16 is an exemplary flow chart illustrating operation of a hub device detecting a doorbell sound. The process shown in FIG. 16 may be implemented by a computing device, such as, but without limitation, hub device 102 or hub controller 104 in FIG. 1.

The process detects a sound at operation 1602. The sound may be detected by a hub device associated with a monitored area, for example. The sound is identified as a doorbell at operation 1604. A notification is sent to at least one user device at operation 1606. In some examples, the user device may be another hub device associated with the monitored area. In other examples, the user device may be a mobile device or other personal device associated with the user. The process determines whether to amplify the sound at operation 1508. If yes, the process amplifies the sound at operation 1610. The amplified sound is played via a set of speakers at operation 1612. The date and time the sound occurred are logged at operation 1615. The process terminates thereafter.

Returning to operation 1608, if the sound is not amplified, the date and time the sound occurred is logged at operation 1614. The process terminates thereafter.

In the example shown in FIG. 16, the process determines whether to amplify the sound. In one non-limiting example, the process determines whether to amplify the sound based on whether a user is present somewhere within the monitored area to hear the amplified sound or absent from the monitored area. For example, if the sound is a doorbell, it may be determined unnecessary to amplify the sound if the user is absent from the monitored area and unable to hear sounds amplified within the monitored area. In another example, if the sound is a security alarm tripped by a broken window or door, the process may amplify the sound even if a user is absent from the monitored area as a deterrent to a potentially unwanted person attempting to gain unauthorized access to a portion of the monitored area.

In another example, the process determines whether to amplify the sound includes determining whether a user is present in the monitored area but not moving or otherwise responding to the sound. In this example, the process may determine that the sound should be amplified and replayed to increase the likelihood that the user will hear or respond to the sound.

In still another example, the process determines whether to amplify the sound based on whether a user profile, based on user configuration or machine learning, indicates that a sound identified as a doorbell is to be amplified if the user is detected as present within the monitored area.

While the operations illustrated in FIG. 16 are described as being performed by a hub device, aspects of the disclosure contemplate that performance of the operations by other entities. For example, a cloud service may perform one or more of the operations in association with a hub device.

Figure 17:
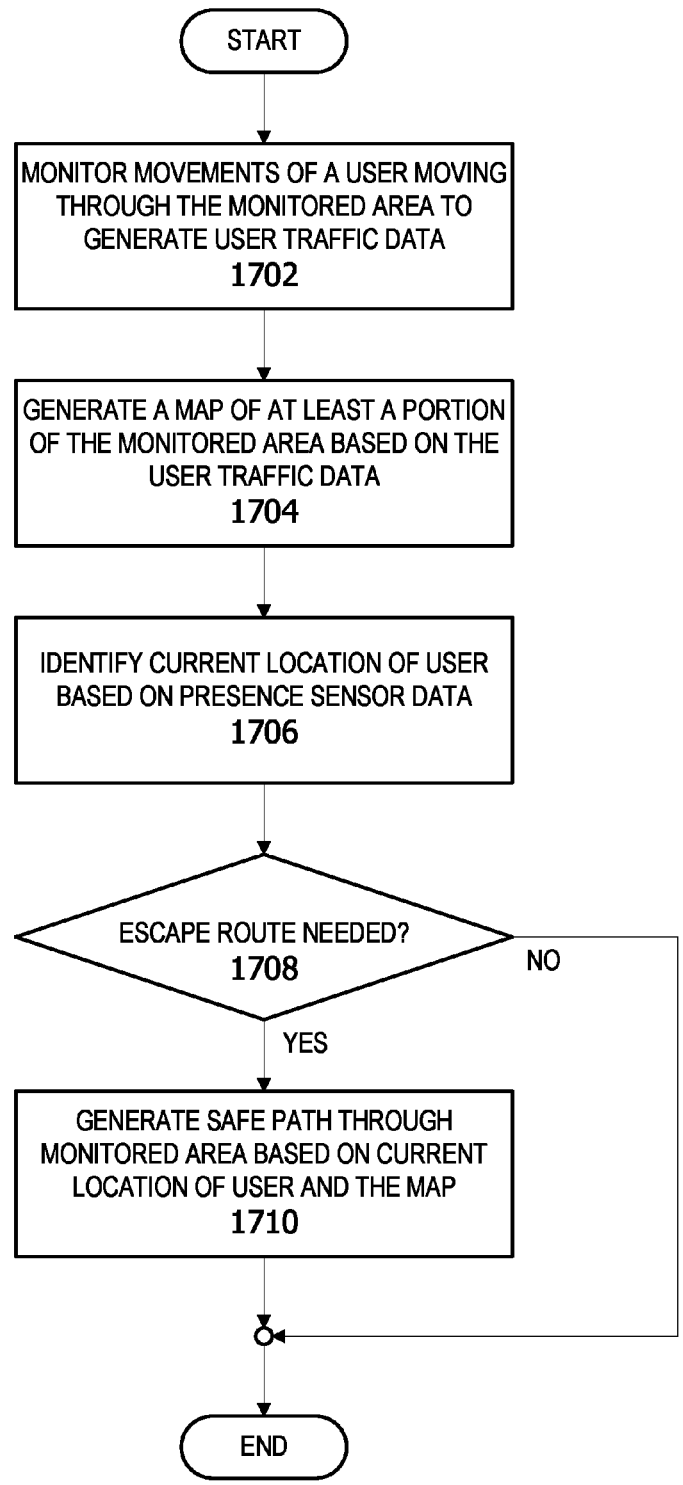
FIG. 17 is an exemplary flow chart illustrating operation of a hub device generating a safe route for a user.

FIG. 17 is an exemplary flow chart illustrating operation of a hub device generating a safe route for a user. The process shown in FIG. 17 may be implemented by a computing device, such as, but without limitation, hub device 102 or hub controller 104 in FIG. 1.

The process monitors movements of a user moving through the monitored area to generate user traffic data at operation 1702. A map of at least a portion of the monitored area is generated based on the user traffic data at operation 1704. A current location of the user is identified based on presence sensor data at operation 1706. The process determines whether a safe route is needed at operation 1708. If no, the process terminates.

If a safe route for a user is needed at operation 1708, the process generates a safe path through the monitored area based on a current location of the user and the map at operation 1710. The process terminates thereafter.

While the operations illustrated in FIG. 17 are described as being performed by a hub device, aspects of the disclosure contemplate that performance of the operations by other entities. For example, a cloud service may perform one or more of the operations in association with a hub device.

FIG. 18 is an exemplary flow chart illustrating operation of a hub device identifying a user based on gait. The process shown in FIG. 18 may be implemented by a computing device, such as, but without limitation, hub device 102 or hub controller 104 in FIG. 1.

The process determines whether movement is detected at operation 1802. If no, the process returns to operation 1802. If a movement is detected, the process switches to an active mode at operation 1804. The process determines whether the movement is made by a human at operation 1806. This determination may be made using one or more sensors communicatively coupled to a hub device, or otherwise in communication with the hub device, such as a camera or other presence sensor. If no, the movement is ignored at operation 1808. The process terminates thereafter.

If the movement is made by a human at operation 1806, the process records the movements by one or more cameras at operation 1810. The process stores the recording of the movements in a data storage, such as a local database, at operation 1812. The process analyzes the recording for gait data at operation 1814. The process matches the gait against a database at operation 1816. If the human is not identified based on the user's gait at operation 1818, the process sends the recording to a user for identification at operation 1820. The process terminates thereafter.

If the process identifies the human based on gait at 1818, the process sends a notification to a user device notifying the user of the identification at operation 1822. The process terminates thereafter.

While the operations illustrated in FIG. 18 are described as being performed by a hub device, aspects of the disclosure contemplate that performance of the operations by other entities. For example, a cloud service may perform one or more of the operations in association with a hub device.

ADDITIONAL EXAMPLES

In some examples, a computer storage media embodying computer-executable components is provided. The components include a monitoring component that is executed to cause at least one processor to monitor movements of at least one user moving through at least a portion of the monitored area to generate user traffic data, the user traffic data comprising user routine data, a set of frequently used traffic patterns, and current location data associated with the at least one user; a mapping component that is executed to cause at least one processor to generate a dynamic map of at least a portion of the monitored area based on the user traffic data, the map comprising a location of a set of rooms and a location of a set of exits; and an analysis component that is executed to cause at least one processor to determine a current location of the at least one user within the monitored area based on a routine of the user, the user traffic data, and the map.

In an example scenario, a hub device monitors at least a portion of a monitored area associated with a structure. The hub device detects a sound via at least one microphone associated with the hub device. On determining a sound level of the sound is below a threshold sound level, the hub device ignores the sound. On determining the sound level of the sound reaches a threshold sound level, the hub device analyzes the sound to determine whether the sound is an identified sound. On determining the sound is an identified sound that is expected, the hub device ignores the identified sound. On determining the sound is an identified sound that is unexpected, the hub device amplifies the identified sound to generate an amplified sound and plays the amplified sound via at least one speaker within the monitored area. On failing to identify the sound, the hub device sends a notification of the occurrence of the unidentified sound to a user device associated with at least one user.

Some current audio devices provide speakers capable of hands free music or hands free phone conversations. However, these systems are limited to a single room or single location, unless the user physically carries the speaker to another location. In contrast, the set of hub devices in some examples provides a multi-room, hands-free routing of streaming audio or video that follows the user as the user moves around the monitored area. When a user listening to an audio stream leaves a first room and moves to a second room, the user's new location is detected and the playback of the audio stream switches from a speaker in the first room to a speaker in the second room. The audio stream may include music, audio books, phone calls, skype calls, or any other type of steaming audio. The audio routing is performed automatically, without any user interaction with the system. This enables improved convenience for users, greater user mobility within the monitored area while listening to streaming audio or watching streaming video, as well as simplified user interaction with the system. This multi-room, hands-free routing of audio and video streaming feature is also more energy efficient because energy is saved by turning off the audio or video player in the rooms that are not occupied.

In other examples, the set of hub devices provides automatic temperature control focused on user occupied rooms. The set of hub devices monitors the temperature and occupation of each room in the monitored area. The set of hub devices turns on heating/cooling systems to concentrate their energy on the rooms that are currently occupied and keep those rooms at a comfortable temperature. This feature is more energy efficient and reduces heating and cooling costs for users.

Moreover, some currently available automation systems include smart thermostats that rely on downloading weather data. These current thermostats only monitor temperature in the location in which it is installed without regard for whether a particular area of the home is occupied or frequently utilized. In contrast, the per-room automation system in some examples includes a set of hub devices that monitor temperature in each room. For example, the set of hub devices gathers data taken from multiple rooms when actively heated or cooled. When the rooms are not occupied, temperature is monitored to prevent situations such as pipes bursting in cold weather. This enables per-room management of room temperature based on whether a room is occupied to reduce heating and air conditioning costs, improve energy efficiency, and customize room temperature to each room occupant for improved user comfort.

In other examples, if the heating is unable to raise the temperature and there is a risk of pipes bursting, the set of hub devices sends one or more notifications to one or more user devices associated with a user. The heating and air conditioning system thermostat in these examples is replaced with a simple remote control switch activated by the one or more hub devices based on the temperature data from the rooms. This feature enables simple upgrade of legacy devices to the automated system and improves energy efficiency by reducing heating and cooling costs based on whether a given room is currently occupied or is likely to be occupied by users in the near future.

In other examples, the per-room set of hub devices makes automation more viable by integrating a plurality of different devices within the system and controlling them based on the presence or absence of the occupants of the structure. This conserves power, reduces energy costs, provides more comfortable temperature levels and lighting, allows occupants to be warned of any issues regarding extreme temperatures within the monitored area, notifies users of alarms, notifies users of the presence of potentially unwanted persons within the monitored area, and provides multi-room routing of streaming audio and video throughout the monitored area that follows a user as the user moves within the monitored area.

With multiple rooms monitored for temperature, in some examples, data is gathered and uploaded to a service and efficiency assessed to compare heat dissipation between rooms. A report is optionally provided to a user regarding insulation or weather proofing recommendations. The report provides data assisting a user in identifying potential issues with energy efficiency, areas where central heating is unbalanced or resulting in more heat in unoccupied rooms, and other areas for improvement.

The set of hub devices in other examples utilizes temperature characteristics of each room that is monitored, the occupation time, potential time of occupation of rooms, outside temperature, and other data to make predictions for best use of energy to maintain comfort levels and energy usage. In a non-limiting example, the set of hub devices records external temperature outside a structure and internal temperature for two or more rooms within the structure over time with information indicating whether the heating or air conditioning was turned on or off at the time the temperature readings were recorded. This temperature data is analyzed to determine overall efficiency of the heating and air conditioning. The set of hub devices may optionally generate recommendations for a user to improve energy efficiency with regard to thermostat settings, insulation, weather proofing, and other corrective measures.

In one example, if a first room does not warm up as quickly as a second room and the heat dissipates slightly quicker in the first room, the set of hub devices provide a warning/notification of the situation to the user regarding these temperature characteristics of the rooms. This information is optionally also utilized by the set of hub devices to determine optimal times for heating or cooling the rooms, etc.

Other currently available automation systems control different devices on multiple protocols, but they rely on applications for user devices that make finding the correct device to control difficult. In contrast, this per-room automation system in some examples provides at least one hub device for each room in a set of rooms associated with a structure. This allows commands and control of other devices to be contextual to a particular room, such as, for example, pressing the light button on a user device hub application to turn the lights on, command the "lights" by voice activation, or by walking into the room to activate the lights without having to specify which room for the light control. This provides improved user control of the system, ease of use for multiple different users, and ease of finding or identifying the correct device to control. The device to control in this example is the other device that is to be turned on, turned off, or otherwise adjusted, such as a light device, audio device, video device, phone, or any other controllable device.

In other examples, the set of hub devices integrate existing systems in a monitored area using sound detection and recognition. In these examples, the system combines a multi-room audio streamer, hub controller, sensor(s), speaker(s), hand-free phone device, and microphone(s) to monitor and control the environment of a portion of a monitored area, such as a room of a home, based on whether the portion of the monitored area is currently occupied or unoccupied. This reduces expenses associated with converting to an automated system. This feature provides ease of use for users, user-friendly configuration of the system, and improved security.

In some examples, the set of hub devices provides multi-room hands-free phone communication that follows the user around a home, structure, or other areas within the monitored area. The set of hub devices enables multi-room capability for routing calls from a hub device in one room to another hub device in a different room. Phone calls being generally private affairs, the phone call follows the user as the user moves from room to room. In this example, the hub devices stream mobile phone conversations using a multi-room hands-free scenario.

Current music streamers frequently utilize upgraded audio equipment, rendering many existing amplifiers redundant. These music streamers are usually expensive as a result. In contrast, the per-room automation system may include a network enabled accessory that is plugged into a device to make the legacy device a networked device. For example, an accessory may be plugged into a legacy music streaming device to make the device compatible with the set of hub devices or the hub application. In still other examples, an accessory is plugged into a landline phone to provide the multi-room, hands-free phone communication routing that follows the user as the user moves throughout the monitored area using a landline phone. This provides for greater convenience and user mobility while utilizing music streamers, making phone calls, and otherwise streaming audio or video within the monitored area.

The set of hub devices may route audio streaming from one room to another as the user moves through the monitored area. The audio streaming may include streaming music, audio books, or any other type of streaming audio. In other examples, the set of hub devices provides multi-room, hands-free routing of skype calls or voice over Internet protocol (VOIP) services. The hub device may output sound from a built-in speaker or through a lineout to be amplified through other audio equipment. If there are multiple users in the monitored area at the same time, one or more users may want to listen to different things at the same time. Each user of the hub application may be assigned a unique media channel on which they assign an input to play. That input may be, without limitation, a playlist for a particular music service, an audio book, a playlist of mp3 files on a media share, an internet radio station, a Bluetooth audio connection from a mobile device streamed from the smart room device it is connected to, a stream from a possible analog to digital converter accessory plugged in to existing audio equipment/TV, or from a potential line-in input on a smart room device, or a phone conversation.

In these examples, a user selects their preferred input via their user device for play on their assigned channel via a hub device in a room co-located with the user. In other embodiments, the user selects input for play on their channel via switches on the hub device.

The set of hub devices may monitor user movements during normal operation of the hub devices, as well as during the initial configuration/set-up stage by asking a user to move around the monitored area during the configuration. The set of hub devices generates the map of a monitored area and knows which rooms lead to which other rooms, for example. The map may also indicate exit points or points of ingress and egress from a structure or area. The hub controller determines a probable or likely destination for a user moving through the monitored area based on machine learning over time as the set of hub devices monitor user movements. For example, when a first room becomes unoccupied as a second room becomes occupied and the first and second rooms are on an adjacent path, the set of hub devices determines that a user is moving from the first room to the second room.

In one example, the user selects an input for play of audio media. The selected input is streamed to the user's assigned channel and played via a speaker in a room occupied by the user. As the user moves from room to room, which may be detected by one or more hub devices via presence sensors or other sensors, the user's channel is pushed to the hub device associated with the room the user is currently occupying. If the hub device switches the wrong channel or incorrect audio for play on speaker, the user may manually switch the channels via voice command, the user device hub application, or via a button on the hub device. In this manner, the user's preferred audio content is easy to find and access via their assigned media channel.

The channel concept in other examples includes video/visual media content. For example, the hub device in these examples includes a headed device with high definition multimedia interface (HDMI) socket to provide video in the same way audio follows users around the monitored area. Therefore, a user entering a room with a headed hub device connected to a screen would show the same video that they had been viewing in another room.

For example, when a user leaves a room that is playing video content, the hub device for that room pauses the content until the user returns to the room. The hub device resumes play of the video content from this position. If the user enters a second room, the second hub device associated with the second room resumes playing the video from the point where the content was paused in the first room with the same channel associated with the user.

In other words, when the user leaves the first room, the hub device sends a command over any compatible protocol, such as AllJoyn, to notify one or more other hub device that the user has left the first room. The hub device saves the stream or channel the user was watching and the position at which the video was paused into that users' profile. The hub device turns off the TV or other device that was playing the video or turns off lights in the now unoccupied room.

When the user enters a second room with another device set up capable of playing the video, the second hub device associated with the second room identifies the user and switches to an active mode. The second hub device sends a command with the stream or channel retrieved from the user's profile and resumes playing the video at the point at which the video was paused permitting the user to continue with the viewing.

In addition, communicating with the TV allows the video stream recorded by one or more cameras located at an exterior of a monitored area to display on the TV being watched by the user if someone approaches or is at an exterior door for example. The one or more cameras may be exterior security cameras, interne protocol (IP) cameras, cameras implemented within a smart doorbell, or any other suitable image capture device.

In this example, the set of hub devices may optionally automatically turn on an external light associated with the door or other area occupied by the visitor to make the visitor more visible to the camera recording the visitor. In this example, a hub device may determine if a light level associated with a camera is below a threshold light level. If the light level is below the threshold, one or more lights in a proximity of the camera are automatically turned on to increase the lighting levels and improve the video recording.

A doorbell may be implemented in some examples, as a standard one button doorbell, a doorbell with basic intercom capabilities, or as a camera with intercom. The hub device processing the notifications and video from a doorbell may be located close to the door if the hub device utilizes BLUETOOTH to communicate with the doorbell. In other examples, the hub device associated with the doorbell may be situated in the room the front door opens into, such as the hallway or entryway. For intercom and video applications, the audio or video stream received from the doorbell is streamed to the hub device over Bluetooth or via a Wi-Fi signal over a protocol such as AllJoyn.

In some examples, when the doorbell is pressed or otherwise activated, the doorbell sends a signal. The signal is received by the hub device, in some examples, it plays a chime sound through the speakers and sends a notification to those who have the associated application on a mobile device or to connected wearable devices.

The hub device in some examples automatically talks to a visitor at the door via a doorbell or intercom interface through connection to a digital assistant. The question "who is it" may be played from a digital assistant through the speaker associated with the doorbell or intercom to the visitor. The hub device may use speaker recognition to identify the visitor based on a verbal response from the visitor captured by a microphone or other audio capture by the hub device.

In this example, the hub device matches the visitor's voice against the internal storage of callers or sends the sound clip to a web service to match voice against a potentially larger storage of previous callers. The hub device saves the sound clip for unrecognized callers. The saved sound clip may be analyzed for later confirmation or identification by a user.

In another example, on receiving the notification that the door bell has been pressed, the hub device sends a signal to one or more other hub devices or one or more user devices to play a notification sound. The voice over internet protocol (VOIP) call is set up to be potentially answered by one of the user devices. On a user device, the user has the option to ignore the caller, speak to the caller or request an identity of the visitor. The same options may be used as voice commands when in audible range of a smart room device.

In some examples, the ignore option results in no further action. The speak-to-caller option connects the VOIP call if answered on a user device or allows an intercom connection from one or more speaker(s) and microphone(s) to the speaker and microphone in the doorbell. The request-an-identity option causes the hub device to ask the visitor to identify themselves. In the case of the application, the user device application opens and lets the user know when an answer is received. If the voice/name combination given by the visitor at the door is recognized, the identity of the visitor is seen by the user who then decides to talk to the visitor, ignore the visitor, or answer the door.

In other examples, the doorbell includes a camera and intercom. When movement is detected, the camera turns on and streams the output to the hub device associated with the doorbell. The hub device optionally turns on an external light in response to detecting the movement.

As the visitor moves toward the doorbell, the hub device attempts to match the face, voice, or gait of the visitor against those cached in its local storage. The hub device, in other examples, checks the face, voice, or gait against those stored in an online service by sending an image to that service. In other words, the hub device may identify the visitor at the door by using facial recognition analysis of the visitor's face, voice recognition analysis of the visitor's voice, or analysis of the visitor's gait. If recognized, when the doorbell is pressed the identity of the visitor is sent with the notification of the doorbell to a user. The notification is sent via one or more other hub devices or one or more user devices. If the visitor is not recognized, the image, voice, or gait data is stored for later identification or analysis, such as by a user or an online service.

In some examples, the notification to the user device(s) includes an image of the visitor captured by the camera. A VOIP call is set up to be potentially answered by one of the user devices. On a mobile device, the user has the option to ignore the caller, speak to the caller or, if a digital assistant hasn't already asked, request an identity of the visitor. The same options may be used as voice commands when in audible range of a smart room device. If there is a TV in the room and it is connected to a capable device, the user may optionally select an answer on TV option to display the door camera video on the TV or other video screen for identification of the visitor. The answer on TV option in this example streams the video images from the camera to a compatible smart TV or smart set top box running a hub device hub application.

In other examples, the user may also select an ask-for-identification (ID) option. The ask-for-ID option prompts the hub controller to ask the visitor to hold up their ID card for the camera. This allows visual confirmation and may be checked for authenticity. The video feed captures an image of the ID that is optionally uploaded to a web service with a database of organizations and their ID card layout. If matched, the image may be further shared with that organization's database to check the ID is genuine.

Where the caller is not identified, the image and any other identifying data is uploaded to a cloud store. Users are notified through their mobile device app or through an online portal and they are able to access all unidentified callers and identify them if they wish.

In one example, if the user chooses to speak to the call, the call is placed on the user's assigned channel. The call follows the user if they are moving between rooms.

For example, a first user is assigned a first media channel. A second user is assigned a second media channel. A third user is assigned a third media channel. The first user in a kitchen area plays a skype call on the first channel. The second user listens to music on the second channel in a bedroom. The third user listens to an audio book on a third channel in another room. As the first user walks from the kitchen to the living room, the skype call on the first channel is switched from a hub device in the kitchen to a hub device in the living room.

In other examples, the hub device may make a prediction as to which room the user departed from or is heading towards based on data received from one or more other hub devices and the map. If media is playing in the previous room, the same media channel is streamed into the new room the user just entered. The hub device communicates over AllJoyn with the one or more hub devices in the previous room to let it know it now has the user's media channel playing. If the previous room is unoccupied, the one or more hub device in that room will switch the audio off.

If a third user is already in the living room when the first user moves from the kitchen to the living room, the hub device in the living room does not change the media channel from the third channel to the first channel unless manually switched by one of the users. Where people in the home cross each other passing through rooms, the set of hub devices attempts to identify which user moved to which rooms and move their channel to the correct room.

Alternatively, or in addition to the other examples described herein, examples include any combination of the following:
  send a recorded sound to a second hub device monitoring a second portion of the monitored area, amplify the recorded sound to generate an amplified sound, and play the amplified sound via at least one microphone in the set of microphones;
  compare a non-oral sound to a plurality of identified sounds to identify the non-oral sound;
  identify a non-oral sound as an alarm on determining the non-oral sound is a repeating sound re-occurring at regular intervals and perform an alarm trigger action on determining the alarm originates within the monitored area;
  generate a safe route based on a map of the monitored area, and output the safe route to at least one user within the monitored area, the safe route including a path through at least a portion of the monitored area leading from a current location of at least one user to a different location;
  generate a map of a monitored area based on user traffic data and a routine of the at least one user, the map including a location of the set of rooms, a location of at least one exit from at least one room in the set of rooms, and a set of frequently used traffic patterns through the monitored area;
  monitor a presence of at least one user within the monitored area and movements of the at least one user moving through the monitored area based on data received from the set of hub devices to generate user traffic data;
  activate at least one hub device in a plurality of hub devices in the monitored area, request event data from the at least one hub device, analyze the event data from the at least one hub device to identify an origin of the alarm, and send a notification to at least one user, the notification comprising an identification of a type of alarm, time of occurrence of the alarm and an origin of the alarm;
  enter an active mode on detecting the sound, analyze data obtained from a plurality of hub devices within the monitored area to determine an origin of the sound, ignore the sound on determining an origin of the sound is outside the monitored area, and return to sleep mode;
  identify a sound as an unexpected, identified sound on determining the sound is a sound of glass breaking during a locked mode;
  monitor a presence of at least one user within the monitored area based on data received from a plurality of hub devices associated with the monitored area, and on determining the sound is an identified sound that indicates a safety hazard prompting evacuation of the at least one user from at least a portion of the monitored area, output a safe route to the at least one user within the monitored area, the safe route indicating a safe path through at least a portion of the monitored area leading from a current location of the at least one user to a different location;
  determine a current location of the at least one user based on presence data received from at least one presence sensor in a set of presence sensors, and send a map showing the safe route to a user device associated with the user;
  automatically turn on a set of lights corresponding to a safe route to illuminate a safe path for a user and automatically turn off a set of lights associated with at least one portion of the monitored area that is not associated with the safe path;
  access a cloud database of pre-identified sounds, and compare the sound to the pre-identified sounds to determine an identification of the sound;
  access a set of pre-identified sounds via an Internet connection, and compare the sound to the pre-identified sounds to determine an identification of the sound;
  monitor movements of at least one user moving through at least a portion of a monitored area to generate user traffic data, the user traffic data including user routine data, a set of frequently used traffic patterns, and current location data associated with the at least one user;

generate a dynamic map of at least a portion of a monitored area based on user traffic data, the map including a location of a set of rooms and a location of a set of exits;

determine a current location of at least one user within the monitored area based on a routine of the user, user traffic data, and the map;

identify a user based on a gait of the user;

generate a safe route identifying a safe route from the current location of the at least one user through at least a portion of the monitored area to a different location based on the map and the current location of the at least one user; and output a safe route to at least one user via a user device.

At least a portion of the functionality of the various elements in FIG. 1 may be performed by other elements in FIG. 1, or an entity (e.g., processor, web service, server, application program, computing device, etc.) not shown in FIG. 1.

In some examples, the operations illustrated in FIG. 12, FIG. 13, FIG. 14, FIG. 15, FIG. 16, FIG. 17, and FIG. 18 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored or collected from the users. In some examples, notice may be provided to the users of the collection of the data (e.g., via a dialog box or preference setting) and users are given the opportunity to give or deny consent for the monitoring or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for a multi-function, per-room automation system. For example, the elements illustrated in FIG. 1, FIG. 2, FIG. 3, FIG. 4, FIG. 5, FIG. 6, FIG. 7, FIG. 8, and FIG. 9, such as when encoded to perform the operations illustrated in FIG. 12, FIG. 13, FIG. 14, FIG. 15, FIG. 16, FIG. 17, and FIG. 18, constitute exemplary means for monitoring a monitored area, exemplary means for detecting a sound, exemplary means for determining if a sound level is below a threshold, exemplary means for identifying the sound, exemplary means for amplifying and playing the amplified sound, and exemplary means for sending a notification to one or more user devices.

In another example, the elements illustrated in FIG. 1, FIG. 2, FIG. 3, FIG. 4, FIG. 5, FIG. 6, FIG. 7, FIG. 8, and FIG. 9, such as when encoded to perform the operations illustrated in FIG. 12, FIG. 13, FIG. 14, FIG. 15, FIG. 16, FIG. 17, and FIG. 18, constitute exemplary means for monitoring movements of one or more users in a monitored area, exemplary means for generating a map of the monitored area, exemplary means for determining a location of a user within the monitored area, and exemplary means for generating a safe route for a user based on the map and the user's current location within the monitored area.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A or at least one of B or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a set of hub devices associated with a monitored area, the monitored area comprising a set of rooms associated with a structure;
   a hub controller within the set of hub devices, the hub controller associated with a first room of the set of rooms, the hub controller monitoring a portion of the monitored area, the hub controller comprising a memory, said memory storing a sound analysis engine;
   one or more sensors communicatively coupled to the hub controller, the one or more sensors configured to detect sound, movement, and environmental changes within the monitored area;
   a processor programmed to execute the sound analysis engine to passively detect a non-oral sound during a sleep mode of the hub controller via at least one microphone in a set of microphones communicatively coupled to the set of hub devices, record the non-oral sound on determining the non-oral sound exceeds a sleep mode threshold sound level to generate a recorded sound, and send a notification of the recorded sound to at least one user device to notify at least one user associated with the user device of the occurrence of the non-oral sound; and
   a machine learning component, executed by the processor, to generate monitoring data based on the detected sound, movement, and environmental changes within the monitored area, and generate a map of the monitored area based on the generated monitoring data and a detected routine of the at least one user associated with the monitored area, the map comprising a representation of a location of the set of rooms and a location of at least one exit from at least one room in the set of rooms.

2. The system of claim 1, wherein the hub controller is a first hub device in the set of hub devices monitoring a first portion of the monitored area, and wherein the processor further executes the sound analysis engine to send the recorded sound to a second hub device in the set of hub devices associated with a second portion of the monitored area, wherein the second hub device amplifies the recorded sound to generate an amplified sound and plays the amplified sound via at least one speaker in a set of speakers communicatively coupled to the set of hub devices.

3. The system of claim 1, wherein the processor further executes the sound analysis engine to compare the non-oral sound to a plurality of identified sounds to identify the non-oral sound.

4. The system of claim 1, wherein the processor further executes the sound analysis engine to identify the non-oral sound as an alarm on determining the non-oral sound is a repeating sound re-occurring at regular intervals and perform an alarm trigger action on determining the alarm originates within the monitored area.

5. The system of claim 4, wherein performing the alarm trigger action further comprises executing the sound analysis engine to generate a safe route based on a map of the monitored area and output the safe route to at least one user within the monitored area, the safe route comprising a path through at least a portion of the monitored area leading from a current location of at least one user to a different location.

6. The system of claim 1, wherein the detected routine is identified by the machine learning component using the generated monitoring data, including by identifying user traffic patterns based on detection of at least one of sound or movement via the one or more sensors.

7. The system of claim 1, wherein the hub controller further comprises:
   a monitoring component, and wherein the processor further executes the monitoring component to monitor an environment of the monitored area to detect a change in the environment of the monitored area.

* * * * *